(12) United States Patent
Konuri

(10) Patent No.: US 11,789,704 B2
(45) Date of Patent: Oct. 17, 2023

(54) DYNAMIC APPLICATION BUILDER FOR MULTIDIMENSIONAL DATABASE ENVIRONMENTS

(71) Applicant: Donyati, LLC, Golden, CO (US)

(72) Inventor: Murali Krishna Konuri, Frisco, TX (US)

(73) Assignee: Donyati, LLC, Golden, CO (US)

( * ) Notice: Subject to any disclaimer, the term of this patent is extended or adjusted under 35 U.S.C. 154(b) by 0 days.

(21) Appl. No.: 17/648,699

(22) Filed: Jan. 24, 2022

(65) Prior Publication Data

US 2022/0236957 A1 Jul. 28, 2022

Related U.S. Application Data

(60) Provisional application No. 63/141,973, filed on Jan. 26, 2021.

(51) Int. Cl.
*G06F 8/30* (2018.01)
*G06F 16/22* (2019.01)
(Continued)

(52) U.S. Cl.
CPC ............... *G06F 8/30* (2013.01); *G06F 8/447* (2013.01); *G06F 8/60* (2013.01); *G06F 16/2246* (2019.01);
(Continued)

(58) Field of Classification Search
None
See application file for complete search history.

(56) References Cited

U.S. PATENT DOCUMENTS 6,266,661 B1   7/2001   Lewish et al.
7,778,910 B2   8/2010   Ballow et al.
(Continued)

FOREIGN PATENT DOCUMENTS

WO   200148636 A1   7/2001

OTHER PUBLICATIONS

International Search Report and Written Opinion dated Mar. 22, 2022 for PCT Application No. PCT/US2022/070302, filed Jan. 24, 2022.
(Continued)

*Primary Examiner* — Lewis A Bullock, Jr.
*Assistant Examiner* — Mark A Gooray
(74) *Attorney, Agent, or Firm* — Honigman LLP

(57) ABSTRACT

Systems and methods for generating custom applications for querying a multidimensional database of a target platform include, responsive to receiving a custom application request, an application definition is discovered based on data received from one or more sources. The application definition indicates target outputs of the custom application, influencers for each of the target outputs that correspond to members of one or more first dimensions of the multidimensional database, and granularity definitions relative to second dimensions of the multidimensional database for each influencer. Mutually exclusive groups each including two or more target outputs are generated by applying a weighting algorithm to the application definition, and resource-efficient machine written code is dynamically generated based on the groupings and the results of the weighting algorithm. The machine written code is compiled into an application package, which is then deployed to the target platform for execution on the multidimensional database.

21 Claims, 5 Drawing Sheets

(51) Int. Cl.
  *G06F 8/60* (2018.01)
  *G06F 16/28* (2019.01)
  *G06F 8/41* (2018.01)

(52) U.S. Cl.
  CPC ........ *G06F 16/2264* (2019.01); *G06F 16/285* (2019.01)

(56) References Cited

U.S. PATENT DOCUMENTS

| | | | |
|---|---|---|---|
| 7,899,725 | B2 | 3/2011 | Ballow et al. |
| 7,933,791 | B2 | 4/2011 | Nelmes et al. |
| 8,265,981 | B2 | 9/2012 | Ficery et al. |
| 2001/0034686 | A1 | 10/2001 | Eder |
| 2004/0133552 | A1 | 7/2004 | Greenfield et al. |
| 2006/0020933 | A1* | 1/2006 | Pasumansky ......... G06F 16/283 717/104 |
| 2007/0027904 | A1 | 2/2007 | Chow et al. |
| 2008/0027841 | A1 | 1/2008 | Eder |
| 2008/0319959 | A1 | 12/2008 | Bireley et al. |
| 2012/0089563 | A1 | 4/2012 | Bakalash et al. |
| 2013/0166495 | A1* | 6/2013 | Kazmaier ............ G06F 16/283 707/E17.014 |
| 2015/0032730 | A1* | 1/2015 | Cialdea, Jr. ............ G06F 16/26 707/722 |
| 2016/0042470 | A1 | 2/2016 | Shaaban et al. |
| 2016/0210572 | A1 | 7/2016 | Shaaban et al. |
| 2017/0116228 | A1 | 4/2017 | Alberg et al. |
| 2017/0116308 | A1 | 4/2017 | Alberg et al. |
| 2022/0012242 | A1* | 1/2022 | Dosch ................ G06F 16/2246 |

OTHER PUBLICATIONS

IBM Cloud Education, "OLAP" dated Jun. 18, 2020, Retrieved on Mar. 6, 2022.

* cited by examiner

| Target Outputs 72 | Influencers 74 | Logic 76 | Name Plate/ Product 80A | Entity/ Location 80B | Customer/ Dealer 80C | Channel (Retail, Fleet) 80D | Period 80E | Currency 80F | Attribute 80G |
|---|---|---|---|---|---|---|---|---|---|
| Net Sales Revenue 72A | | | By Each Product 84A-1 | By Each Entity 84B-1 | By Each Customer 84C-1 | By Each Channel 84D-1 | By Each Month 84E-1 | By Each Currency 84F-1 | DepA 84G-1 |
| | Volume/ No. of Units 74A | * 76A | By Each Product 82A-1 | By Each Entity 82B-1 | By Each Customer 82C-1 | By Each Channel 82D-1 | By Each Month 82E-1 | None 82F-1 | DepA 82G-1 |
| | Per Unit Price 74B | + 76B | By Each Product 82A-2 | By Each Entity 82B-2 | By Each Customer 82C-2 | By Each Channel 82D-2 | By Each Month 82E-2 | By Each Currency 82F-2 | DepA 82G-2 |
| | Premium 74C | - 76C | None 82A-3 | By Each Entity 82B-3 | By Each Customer 82C-3 | By Each Channel 82D-3 | By Each Month 82E-3 | By Each Currency 82F-3 | DepA 82G-3 |
| | Military Discount 74D | | None 82A-4 | By Each Entity 82B-4 | By Each Customer 82C-4 | By Each Channel 82D-4 | By Each Month 82E-4 | By Each Currency 82F-4 | DepA 82G-4 |
| Third Party Licensing Revenue 72B | | | By Each Product 84A-2 | By Each Entity 84B-2 | By Each Customer 84C-2 | By Each Channel 84D-2 | By Each Month 84E-2 | By Each Currency 84F-2 | DepA 84G-2 |
| | Volume/ No. of Units 74E | * 76D | By Each Product 82A-5 | By Each Entity 82B-5 | By Each Customer 82C-5 | By Each Channel 82D-5 | By Each Month 82E-5 | None 82F-5 | DepA 82G-5 |
| | Per Unit Fee 74F | + 76E | By Each Product 82A-6 | By Each Entity 82B-6 | By Each Customer 82C-6 | By Each Channel 82D-6 | By Each Month 82E-6 | By Each Currency 82F-6 | DepA 82G-6 |
| | Overhead 74G | | None 82A-7 | By Each Entity 82B-7 | By Each Customer 82C-7 | By Each Channel 82D-7 | By Each Month 82E-7 | By Each Currency 82F-7 | DepA 82G-7 |

FIG. 2

| Target Outputs 72 | Influencers 74 | Logic 76 | Name Plate/ Product 80A | Entity/ Location 80B | Customer/ Dealer 80C | Channel (Retail, Fleet) 80D | Period 80E | Currency 80F | Attribute 80G | Generated Identifier |
|---|---|---|---|---|---|---|---|---|---|---|
| Net Sales Revenue 72A | | | 1 88A-1 | 1 88B-1 | 1 88C-1 | 1 88D-1 | 1 88E-1 | 1 88F-1 | DepA 84G-1 | 111111DepA 92A |
| | Volume/ No. of Units 74A | * 76A | 1 86A-1 | 1 86B-1 | 1 86C-1 | 1 86D-1 | 1 86E-1 | 0 86F-1 | DepA 82G-1 | 111110DepA 90A |
| | Per Unit Price 74B | + 76B | 1 86A-2 | 1 86B-2 | 1 86C-2 | 1 86D-2 | 1 86E-2 | 1 86F-2 | DepA 82G-2 | 111111DepA 90B |
| | Premium 74C | - 76C | 0 86A-3 | 1 86B-3 | 1 86C-3 | 1 86D-3 | 1 86E-3 | 1 86F-3 | DepA 82G-3 | 011111DepA 90C |
| | Military Discount 74D | | 0 86A-4 | 1 86B-4 | 1 86C-4 | 1 86D-4 | 1 86E-4 | 1 86F-4 | DepA 82G-4 | 011111DepA 90D |
| Third Party Licensing Revenue 72B | | | 1 88A-2 | 1 88B-2 | 1 88C-3 | 1 88D-4 | 1 88E-5 | 1 88F-6 | DepA 84G-2 | 111111DepA 92B |
| | Volume/ No. of Units 74E | * 76D | 1 86A-5 | 1 86B-5 | 1 86C-5 | 1 86E-5 | 1 86E-5 | 0 86F-5 | DepA 82G-5 | 111110DepA 90E |
| | Per Unit Fee 74F | + 76E | 1 86A-6 | 1 86B-6 | 1 86C-6 | 1 86D-6 | 1 86E-6 | 1 86F-6 | DepA 82G-6 | 111111DepA 90F |
| | Overhead 74G | | 0 86A-7 | 1 86B-7 | 1 86C-7 | 1 86D-7 | 1 86E-7 | 1 86F-7 | DepA 82G-7 | 011111DepA 90G |

FIG. 3

DYNAMIC APPLICATION BUILDER FOR MULTIDIMENSIONAL DATABASE ENVIRONMENTS

CROSS REFERENCE TO RELATED APPLICATION

The present application claims the filing benefits of U.S. provisional application Ser. No. 63/141,973, filed Jan. 26, 2021, which is hereby incorporated herein by reference in its entirety.

BACKGROUND

Because of the technical complexity, vast data content, and varying structure of multidimensional databases, applications for querying and processing data from such databases are typically developed through ad hoc manual time consuming processes that often result in inefficient applications with low precision and high rates of error.

SUMMARY

In one example, a system for generating custom applications for querying a multidimensional database of a target platform is provided. The system includes at least one processor and at least one memory device. The at least one memory device stores computer-executable instructions that upon execution by the at least one processor cause the at least one processor to receive a request to build a custom application for querying a multidimensional database of a target platform, and discover an application definition for the custom application by making an API call to a master data source associated with the multidimensional database. The API call retrieves master data that indicates a hierarchical structure of the multidimensional database, which is used by the at least one processor to determine the application definition. The application definition indicates target outputs to be produced by the custom application based on data stored in the multidimensional database, influencers for each of the target outputs that correspond to members of one or more first dimensions of the multidimensional database, and granularity definitions relative to second dimensions of the multidimensional database for each of the influencers. The computer-executable instructions upon execution also cause the at least one processor to automatically group the target outputs into a plurality of mutually exclusive groups each including two or more of the target outputs by applying a weighting algorithm to the application definition. The weighting algorithm assigns first weights to each influencer relative to the second dimensions based on the granularity definitions for the influencer, assigns second weights to each target output relative to the second dimensions that correspond to the first weights assigned to the influencers for the target output, and identifies the target outputs for each group based on the second weights assigned to each target output. The computer-executable instructions upon execution also cause the at least one processor to dynamically generate machine written code that includes a distinct code block for each group of target outputs, where the distinct code block for each group includes a first portion and a second portion. The first portion of the code block for each group is generated based on the second weights assigned to the target outputs of the group and is configured to retrieve a section of the multidimensional database corresponding to the second weights assigned to the target outputs of the group. The second portion of the code block for each group is generated based on the first weights assigned to the influencers for the target outputs of the group and is configured to generate the target outputs of the group based on the retrieved section. The computer-executable instructions upon execution also cause the at least one processor to compile the machine written code into an application package corresponding to the target platform that is configured to query data from the multidimensional database and generate the target outputs based on the queried data according to the code blocks, and deploy the application package to the target platform for execution on the multidimensional database.

In a further example, a method for generating custom applications for querying a multidimensional database of a target platform is provided. The method includes receiving, by at least one processor, a request to build a custom application for querying a multidimensional database of a target platform, and discovering, by the at least one processor, an application definition for the custom application by making an API call to a master data source associated with the multidimensional database. The API call retrieves master data that indicates a hierarchical structure of the multidimensional database, which is used to determine the application definition. The application definition indicates target outputs to be produced by the custom application based on data stored in the multidimensional database, influencers for each of the target outputs that correspond to members of one or more first dimensions of the multidimensional database, and granularity definitions relative to second dimensions of the multidimensional database for each of the influencers. The method further includes automatically grouping, by the at least one processor, the target outputs into a plurality of mutually exclusive groups each including two or more of the target outputs by applying a weighting algorithm to the application definition. The weighting algorithm assigns first weights to each influencer relative to the second dimensions based on the granularity definitions for the influencer, assigns second weights to each target output relative to the second dimensions that correspond to the first weights assigned to the influencers for the target output, and identifies the target outputs for each group based on the second weights assigned to each target output. The method further includes dynamically generating, by the at least one processor, machine written code that includes a distinct code block for each group of target outputs, where the distinct code block for each group includes a first portion and a second portion. The first portion of the code block for each group is generated based on the second weights assigned to the target outputs of the group and is configured to retrieve a section of the multidimensional database corresponding to the second weights assigned to the target outputs of the group. The second portion of the code block for each group is generated based on the first weights assigned to the influencers for the target outputs of the group and is configured to generate the target outputs of the group based on the retrieved section. The method further includes compiling, by the at least one processor, the machine written code into an application package corresponding to the target platform that is configured to query data from the multidimensional database and generate the target outputs based on the queried data according to the code blocks, and deploying, by the at least one processor, the application package to the target platform for execution on the multidimensional database.

In another example, a computer program for generating custom applications for querying a multidimensional database of a target platform is provided. The computer program includes a non-transitory computer readable medium storing computer-executable instructions that upon execution by one or more processors cause the one or more processors to receive a request to build a custom application for querying a multidimensional database of a target platform, and discover an application definition for the custom application by making an API call to a master data source associated with the multidimensional database. The API call retrieves master data that indicates a hierarchical structure of the multidimensional database, which is used to determine the application definition. The application definition indicates target outputs to be produced by the custom application based on data stored in the multidimensional database, influencers for each of the target outputs that correspond to members of one or more first dimensions of the multidimensional database, and granularity definitions relative to second dimensions of the multidimensional database for each of the influencers. The computer-executable instructions upon execution also cause the one or more processors to group the target outputs into a plurality of mutually exclusive groups each including two or more of the target outputs by applying a weighting algorithm to the application definition. The weighting algorithm assigns first weights to each influencer relative to the second dimensions based on the granularity definitions for the influencer, assigns second weights to each target output relative to the second dimensions that correspond to the first weights assigned to the influencers for the target output, and identifies the target outputs for each group based on the second weights assigned to each target output. The computer-executable instructions upon execution also cause the one or more processors to dynamically generate machine written code that includes a distinct code block for each group of target outputs, where the distinct code block for each group includes a first portion and a second portion. The first portion of the code block for each group is generated based on the second weights assigned to the target outputs of the group and is configured to retrieve a section of the multidimensional database corresponding to the second weights assigned to the target outputs of the group. The second portion of the code block for each group is generated based on the first weights assigned to the influencers for the target outputs of the group and is configured to generate the target outputs of the group based on the retrieved section. The computer-executable instructions upon execution also cause the one or more processors to compile the machine written code into an application package corresponding to the target platform that is configured to query data from the multidimensional database and generate the target outputs based on the queried data according to the code blocks, and deploy the application package to the target platform for execution on the multidimensional database.

BRIEF DESCRIPTION OF THE DRAWINGS

FIG. 2 illustrates a driver definition template that may be generated by the operating environment of FIG. 1.

FIG. 3 illustrates a result of applying a weighting algorithm to an application definition discovered by the operating environment of FIG. 1 to generate a custom application.

DETAILED DESCRIPTION

Figure 1:
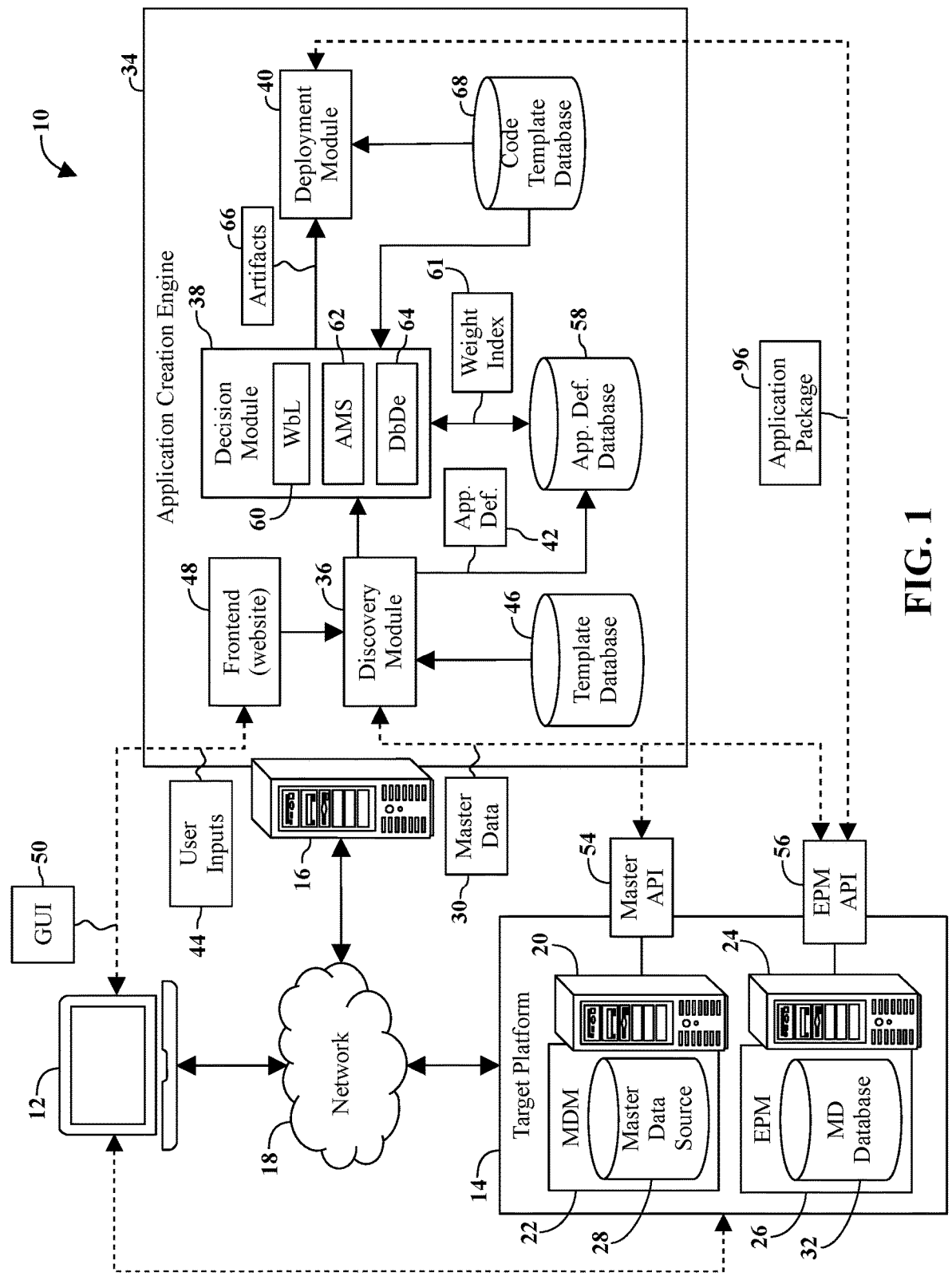
FIG. 1 illustrates an operating environment for dynamically and automatically generating custom applications for execution in multidimensional database environments.

FIG. 1 illustrates an operating environment 10 for automatically and dynamically generating custom applications for execution in multidimensional database environments. The operating environment 10 may include a user device 12, a target platform 14, and an application builder server 16. Each of these systems may communicate with one another via one or more private and/or public networks 18, such as the Internet.

The user device 12 may be a computing device that enables users to access remote systems, such as the target platform 14 or the application builder server 16, over the one or more networks 18. For instance, the user device 12 may be a laptop, desktop, thin client terminal, mobile device, or tablet. The user device 12 may include a web browser or one or more apps for connecting with the remote systems over the one or more networks 18.

The target platform 14 may be a computing platform on which a custom application is desired to be deployed and executed. The target platform 14 may be a multidimensional database environment, and may include a combination of hardware and/or software configured for maintaining multidimensional databases in connection with various applications. In one example, the target platform 14 may be configured to provide organizational and analytical services to a wide range of operational aspects of an enterprise using one or more multidimensional databases. The target platform 14 may be hosted locally by the user of the target platform 14, such as at the enterprise served by the target platform 14. Alternatively, the target platform 14 may be provided as a cloud service to which multiple enterprise users are able to subscribe and access over the Internet.

In some examples, the target platform 14 may include a master data management (MDM) server 20 configured to implement an MDM system 22 for an enterprise, and may include an enterprise performance management (EPM) server 24 configured to implement an EPM system 26 for an enterprise. In alternative examples, the MDM system 22 and EPM system 26 for an enterprise may be hosted on separate target platforms 14.

The MDM system 22 may be configured to implement and maintain a master data source 28 that stores master data 30 for an enterprise. The master data 30 may generally indicate the assets, liabilities, accounts, and structure of the enterprise and the relationships between these various items. For instance, the master data 30 may indicate a hierarchy of products, accounts, customers, lines of business, reporting time periods, and so on of the enterprise. The master data 30 may also indicate the hierarchal structure of one or more multidimensional databases 32 of the enterprise, described in more detail below. Portions of the stored master data 30 may concern and be affected by various business units and applications across the enterprise. The MDM system 22 may be communicatively coupled to these business units and applications, and may be configured to update the master data 30 as operations across the enterprise result in changes to the master data 30 to ensure the timeliness, accuracy and completeness of the master data 30.

The EPM system 26 may be configured to implement one or more multidimensional databases 32 for an enterprise, which may also be referred to as cubes, and may be configured to leverage the multidimensional databases 32 for planning, budgeting, forecasting, and reporting business performance of the enterprise. Each multidimensional database 32 may be conceptualized as a multi-dimensional matrix (e.g., three or more dimensions) with each dimension representing the highest consolidation level of the multidimensional database 32. Exemplary dimensions of a multidimensional database 32 for an enterprise may include an accounts dimension, products dimension, locations dimension, customers dimension, sales channels dimension, periods dimension, and currencies dimension, to name a few.

Each dimension may include a plurality of members, each of which may also include a plurality of members. Each dimension may thus be organized as a hierarchical tree structure with the dimension itself serving as the root node and a parent node to one or more members, each of which may either be a leaf node or be a parent node to one or more other members, and so on. For instance, the accounts dimension may include and be a parent node to a volume member, a per unit price member, a premium member, and a military discount member. The products dimension may include and be a parent node to a member for each product line of the enterprise, which in turn may include and be a parent node to a member for each product of the product line. A given combination of members each from a different dimension of a multidimensional database 32 may represent an intersection of those members within the multidimensional database 32, and may point to a data value in the multidimensional database 32 that corresponds to the combination.

The members under a parent node of a dimension may be referred to as descendants of the parent node, and the members above a given member (and the root node) of a dimension may be referred to as ancestors of the given member. The members one level under a parent node of a dimension may be referred to as the children of that parent node, and the multidimensional database 32 may store computation logic defining how the children of a parent node relate to the parent node (e.g., summation, subtraction, mathematical formula).

The different levels of consolidation within a dimension may be considered as distinct generations of the dimension, with the root node of the dimension belonging to generation one of the dimension, and each subsequent level of members belonging to a different iteratively numbered generation of the dimension. More specifically, each member a same distance from the root node of the dimension may be part of a same generation of the dimension, with the generations having incrementally increasing numbers as the distance between the members of the generation from the root node increases. For instance, referring to the products dimension described above, generation one may include the products dimension, generation two may include the product line members, and generation three may include the products of each product line member.

The complex structure and vast amount of data supported by multidimensional databases 32 enables organizing and processing data to a scale that extends well beyond what is practically possible by the human mind or using pen and paper. Correspondingly, computer-executable applications may be developed and executed against multidimensional databases 32 for querying and processing data therefrom to derive useful information. When the target platform 14 is serving an enterprise, for example, such applications may be employed for the purposes of planning, budgeting, forecasting, and reporting business performance at different levels of granularity. For instance, an application may be developed that is configured, upon execution on the target platform 14, to generate and display a comprehensive view of net sales revenue of the enterprise that is broken down by one or more members of one or more dimensions of the multidimensional databases 32 (e.g., by product, entity, customer, sales channel, period, and so on).

Because of significant variations from industry to industry and even between enterprises within the same industry, applications often need to be customized to the specific structure of the enterprise and of the multidimensional databases 32 of the enterprise. To provide such customization, an enterprise may hire a developer that spends considerable time (e.g., multiple days) manually analyzing the enterprise's structure, identifying computation logic related to the desired target outputs of the application relative to the structure of the enterprise's multidimensional databases 32, and writing separate computer code for each desired target output that is configured upon execution to query and process data from the multidimensional databases 32 to generate the target outputs. Given the technical complexity, vast amount of data content, and uniqueness of multidimensional databases 32 across different enterprises, developing and deploying such applications in this manner is a relatively lengthy process that may result in inefficient applications with low precision and high rates of error.

For instance, the chart of accounts that are used by an automotive manufacturing company may differ significantly from that of a pharmaceutical company, both of which may desire an application configured to query and process data from its multidimensional databases 32 to derive a net sales revenue with a specified granularity level. The calculation of net sales revenue for the automotive manufacturing company may depend on the volume of vehicles sold, price per vehicle, seasonal discounts applied during certain months of the year, and cost of promotions such as 0% interest financing. Conversely, the calculation of net sales revenue for a pharmaceutical company may depend on sales volume, licensing fee/royalty revenues, rebates for commercial, employer-sponsored or self-insured health plans, and regulatory price adjustments. The drivers and computation logic for determining net sales revenue for each of these enterprises may thus widely vary.

The granularity of data for each desired target output also adds to the complexity of the above problem. Data granularity is a nuanced and layered challenge for both computers and humans alike. Multidimensional databases 32 for a given enterprise may have ten to fifteen dimensions each with a hierarchy of thousands of members based on the complexity of the enterprise. Manually analyzing such relationships to determine appropriate source data and computation logic for providing desired target outputs is cumbersome, imprecise, and often error prone.

For instance, continuing with the above examples, the volume of vehicles sold by an automotive manufacturing company may be further defined in its multidimensional databases 32 by legal entity, name plate (e.g., vehicle make and model), transaction currency, sales channel (e.g., retail vs. fleet), customer, and whether the customer is an external entity (e.g., a car dealership) or represents an internal transfer of assets (e.g., plant in Singapore shipping a finished product to a plant in Canada for sale in the Canadian market). The latter may be relevant to whether sales are double counted. Conversely, the volume of sales by a pharmaceutical company may be further defined in its multidimensional databases 32 by sale location, entity that recognizes the sale as revenue, hospital system that prescribed the drug resulting in the sale, rebate rate corresponding to the sale, and any additional discounts that were applied to the sale per the contract with the pharmacy benefits manager (PBM).

The granularity of data may also vary between accounts of an enterprise's chart of accounts. For instance, the head count of manufacturing labor may be further broken down by entity/location but not by product. Because labor may work on multiple products, it may not be possible to track a per person cost by each individual product manufactured at a plant. As a further example, sales volume may be further broken down by product name but not by cost center (e.g., Information Technology, Services General, Accounting, and Manufacturing).

The above examples highlight the complexities and technical difficulties of developing applications for querying and deriving target outputs from the multidimensional databases 32 of various enterprises. The application builder server 16 overcomes these technical difficulties by providing a streamlined custom application generation solution for multidimensional database environments. Specifically, the application builder server 16 is configured to implement an algorithm that facilitates automatically generating custom, stable, and resource-efficient applications for querying an enterprise's unique multidimensional databases 32 and accurately providing target outputs desired by the enterprise. Compared with the manual process described above, the application builder server 16 is typically able to generate and deploy application packages for multidimensional database environments in about fifteen minutes or less, with such application packages often including 50%-80% less code than applications previously developed for multidimensional database environments. The application packages developed by the application builder server 16 thus consume fewer resources of the target platform 14 and query and process data from the multidimensional databases 32 with increased speed and efficiency. The operating environment 10, or more particularly the application builder server 16, thus greatly enhances the technical field of databases.

The application builder server 16 may host an application creation engine 34 configured to generate the custom applications for querying and deriving target outputs from an enterprise's multidimensional databases 32. The application creation engine 34 may include a discovery module 36, a decision module 38, and a deployment module 40. These modules may be defined by distinct sets of computer program instructions executing on a processor of the application builder server 16, and may be configured to implement an algorithm for automatically generating resource-efficient custom applications for various enterprises across various industries. The modules may be configured to cooperate with one another, with various databases, and various external systems, such as the user device 12, the MDM system 22, and the EPM system 26, to facilitate creation of the dynamic machine written applications.

The discovery module 36 may be configured to discover an application definition 42 defining various configuration parameters for a requested custom application, including dimensions, user inputs, dashboards, and computation logic for the custom application, and store the application definition for machine driven analysis and decisions. For example, the discovery module 36 may be configured to discover the application definition 42 based on user inputs 44 received from a user via the user device 12 and/or master data 30 retrieved from the master data source 28.

For example, the application definition 42 may indicate several target outputs to be produced by the custom application from data stored in the multidimensional databases 32, influencers for each of the target outputs that impact calculation of the target output, computation logic for each target output that defines a relationship between the influencers for the target output and the target output, and granularity data for each target output.

Each target output may indicate a data item (e.g., an account) to be calculated and output by the custom application based on data retrieved from the multidimensional databases 32, such as in a form that allows the data item to be viewed and digested by the user at different levels of granularity (e.g., by product, sales channel, month). For instance, the custom application may be configured to output a multidimensional data cube similar to the multidimensional databases 32 for each target output. The target outputs may thus define a left hand side (LHS) of equations machine written by the application creation engine 34 for the custom application.

The influencers, computation logic, and granularity data may define the right hand side (RHS) of the machine written equations. The influencers indicated for each target account may correspond to members of one or more dimensions of the multidimensional databases 32 that impact the target account (e.g., component accounts that combine to form the target output). The computation logic for each target output may indicate a formula for calculating the target output from the influencers (e.g., addition, multiplication, division, subtraction). The granularity data for each target output may indicate a granularity level of each influencer for the target output relative to other dimensions of the multidimensional databases 32 to use for calculating the target output (e.g., use influencer data broken down by product, entity, customer, channel, time period, and currency within the multidimensional databases 32). The granularity data for each target output may also indicate a granularity level to provide for the target output relative to the other dimensions (e.g., generate the target output broken down by product, entity, customer, channel, time period, and currency).

The discovery module 36 may be coupled to a template database 46 and a frontend portal 48, such as a website, hosted by the application builder server 16. A user may access the frontend portal 48 via the user device 12, and may thereby submit a request to the discovery module 36 to build a custom application for the target platform 14, or more particularly for the EPM system 26 of the target platform 14. The user may also provide user inputs 44 indicating selected configuration parameters for the custom application through the frontend portal 48, such as application type, currency process type, currency rates method, eliminations strategy, cube information, period granularity, fiscal calendar, dimensionality, driver definition, form definition, security matrix, and master data source.

The application type configuration parameter may indicate the type of target platform 14 for which the custom application is desired. Different target platforms 14 may support different programming languages and storage structures (e.g., data blocks, index, hybrid), and a given target platform 14 may provide different subscription levels that support varying program languages and storage structures. The application type may thus indicate a programming language and storage structure compatible with the target platform 14 for the given user. The application type may also indicate one or more purposes of the application, such as driver based forecasting, what if scenarios, long range planning, variance analysis, and rolling forecasts. The application type may also indicate the target outputs for the custom application.

The currency process type configuration parameter may define translation/transaction logic for the custom application. Multi-national companies may perform their revenue and expense planning in local currencies, and financials may need to be translated to the corporate reporting currency (usually the corporate location) for management reporting and analysis. Furthermore, while most business units trade in the local currency where the business unit is physically located, there are times when a business unit executes purchase orders and revenue contracts in a non-local currency. These exceptions introduce complexity into the currency translation process and need to be treated differently when calculating from transaction currency to the business unit currency and then to the reporting currency. The currency process type configuration parameter may thus define such translations/transactions logic generated for the requested application by the decision module 38.

The currency rates method configuration parameter may define how currency conversion rates are to be loaded by the requested custom application. As an example, this information may be used by the application creation engine 34, or more particularly the decision module 38, to determine whether to multiply or divide by conversion rates to convert from transaction/entity currency to reporting currencies. This configuration parameter may work in conjunction with the currency process type configuration parameter described above.

The eliminations strategy configuration parameter may be designed to eliminate double counting of intra company transactions by the custom application. While such transactions may be relevant to tracking and measuring the performance of each business segment/unit, when reporting performance outside the company, it may be desired that they are eliminated. For instance, the eliminations strategy configuration parameter may indicate to eliminate transactions between buyers and sellers within the company, and may indicate to eliminate transactions between business segments or lines of business of the company. The eliminations strategy configuration parameter may cooperate with internal and external customer hierarchies identified by the discovery module 36, such as from the master data 30 and/or the user inputs 44, to enable the decision module 38 to generate machine written elimination code for the requested custom application, and to support hierarchies for management and external reporting.

The cube information configuration parameter may indicate the count, names, and types of the cubes forming the multidimensional databases 32 of the enterprise. The decision module 38 may utilize this parameter to generate machine written code specific to accessing and querying data from the multidimensional databases 32 of the enterprise.

The period granularity configuration parameter may define the time granularity in which the enterprise plans their financials, such as by year, quarter, month, week, day, or a combination thereof. The fiscal calendar configuration parameter may indicate the first month of a calendar year for the enterprise, such as defined in the enterprise's EPM system 26. The decision module 38 may be configured to utilize these configuration parameters to set up the proper computation logic for rolling balances, inventories, setting up reporting periods, and so on.

The dimensionality configuration parameter may define the granularity of data that a company uses to organize its assets and accounts and plan its finances. For instance, the dimensionality configuration parameter may indicate that the enterprise plans their sales volume by product, forecasts their revenue by line of business, plans their head count by cost center, and so on. The dimensionality configuration parameter may include information derived from the retrieved master data 30, such as an identification of the dimensions of the enterprise's multidimensional databases 32, and the structure of such dimensions (e.g., members, hierarchies, dimensional computation logic).

The driver definition configuration parameter may indicate the target outputs to be output by the custom application, and may indicate the influencers, computation logic, and the granularity data for each target output as described above. The driver definition configuration parameter may also indicate any exceptions to be applied to the influencers in the calculation of the target outputs, as described in more detail below.

The form definition configuration parameter may indicate how the output of the application is presented to the user. For instance, the form definition configuration parameter may define, for each target output, how to represent the target output in a table format (e.g., what data content to place in the rows and columns of the table). The security matrix configuration parameter may indicate who can access which entries of each target output. For instance, the security matrix configuration parameter may indicate that a user from a particular business unit of the enterprise can access portions of the target outputs that are relevant to that business unit, but not other portions.

The master data source configuration parameter may identify a location (e.g., Internet address) of the MDM system 22 and the master data source 28 for the enterprise. The discovery module 36 may be configured to determine the application definition 42 based on a combination of master data 30 retrieved from the master data source 28 using the master data configuration parameter and user inputs 44 provided via the user device 12.

A user may access the discovery module 36 and submit a request to build a custom application for the target platform 14, or more particularly for the EPM system 26, for querying and processing data from one or more multidimensional databases 32 of the EPM system 26 via the user device 12 and the frontend portal 48. Responsive to receiving a request for a custom application, the discovery module 36 may be configured to generate and communicate a graphical user interface (GUI) 50 to the user device 12 via the frontend portal 48. The GUI 50 may enable the user to submit user inputs 44 for defining the application definition 42 described above. The discovery module 36 may also be configured to dynamically update the GUI 50 as user inputs 44 are entered to streamline and guide the user in providing data for the application definition 42. For instance, the discovery module 36 may be configured to build Visual Basic for Applications (VBA) templates for the GUI 50 on the fly based on the user inputs 44 received through the GUI 50 that are optimized for collecting the above described configuration parameters from the user. These templates may also have built in validations for checking entered data for errors.

As an example, responsive to receiving a request to generate a custom application for querying and processing data from the one or more multidimensional databases 32 of a target platform 14, the discovery module 36 may be configured to communicate a GUI 50 to the user device 12 that provides fields for entering target outputs for the custom application, a location (e.g., Internet Address) of the MDM system 22 (and master data source 28) and of the EPM system 26 (and the multidimensional databases 32) for the enterprise of the user requesting the application, and credentials for these systems.

Responsive to receiving the location and credentials for the MDM system 22, the discovery module 36 may be configured to make an API call to the MDM system 22, such as via a master data API 54 provided by the MDM system 22, to retrieve master data 30 from the master data source 28 that indicates the dimensions, members, hierarchies, and internal computation logic of the multidimensional databases 32. The discovery module 36 may then be configured to dynamically update the GUI 50 to list these dimensions, such as in one or more dropdown lists, as options selectable by the user for defining the driver definition configuration parameter for the custom application.

In particular, a user may interact with the GUI 50 to select one or more of the listed dimensions as relevant to the custom application. For instance, the user may select one or more of the listed dimensions as influencer dimensions, the members of which may provide influencers for the target outputs, and may select one or more of the dimensions as granularity dimensions, the members of which may provide granularity definitions for the selected influencers. Responsive to selecting one or more of the listed dimensions, the discovery module 36 may be configured to dynamically update the GUI 50 to list the members of the selected dimensions as selectable options for defining influencers and granularity definitions for each target output, such as in the form of dropdown lists. The discovery module 36 may also be configured to dynamically update the GUI 50 to include fields for defining the calculation logic for each target output as the influencers for each target output are selected.

As an example, responsive to receiving user inputs 44 submitted via the GUI 50 indicating the target outputs and relevant dimensions, the discovery module 36 may be configured to dynamically generate a driver definition template that is optimized based on the received data to guide a user in defining a driver definition for the custom application. In particular, the driver definition template generated by the discovery module 36 may have a table format with rows prepopulated with the target outputs and columns prepopulated with the indicated dimensions. The discovery module 36 may then be configured to update the GUI 50 with the driver definition template, which the user may interact with to define the driver definition for the custom application.

At least one of the dimensions, such as the dimensions corresponding to measures of an enterprise (e.g., accounts dimension), may be tagged as an influencer dimension within the driver definition template (e.g., a dimension from which influencers may be selected), and the remaining dimensions may be tagged as granularity dimensions within the driver definition template (e.g., dimensions that provide granularity to the influencers). Such tagging may have been performed manually by a user via the GUI 50 as described above, or may be performed automatically by the discovery module 36 based on the type of dimension (e.g., currency, accounts, period, product), which may be indicated in the retrieved master data 30 and/or defined manually by the user via the GUI 50. In particular, the template database 46 may store data associating various dimension types each with the influencer dimension tag or the granularity dimension tag. The driver definition template may then enable the user to modify the default tags if desired.

The discovery module 36 may also be configured to prepopulate the driver definition template with the structure of each dimension, such as the members, hierarchies, and/or internal computation logic of each dimension, which may be indicated in the master data 30 retrieved from the master data source 28. As an example, for each target output, the driver definition template may provide one or more influencer dropdown lists that list the members, hierarchy, and/or computation logic of each influencer dimension. A user may then interact with the influencer dropdown lists associated with each target output to select members of the influencer dimensions to serve as influencers for the target outputs.

Responsive to selection of an influencer for a given target output, the driver definition template may be configured to automatically generate granularity dropdown lists in association with the selected influencer, with each granularity dropdown list being for defining a granularity definition for the influencer relative to a different granularity dimension. To this end, each granularity dropdown list may be prepopulated with the structure of the granularity dimension associated with the dropdown list, such as the members, generations, and groups of children of the granularity dimension. A user may then interact with the dropdown lists to select one or more of the listed items as granularity definitions for the influencer relative to the granularity dimensions.

Responsive to selection of an influencer for a given target output, the driver definition template may also be configured to automatically display another dropdown list that enables the user to define another influencer for the target output if desired, and display a field for defining computation logic for the target output relative to the selected influencer. In some examples, the driver definition template may also be configured to provide granularity dropdown lists for each target output that enable a user to select a granularity definition for each target output relative to each granularity dimension.

In some instances, the discovery module 36 may be configured to receive additional driver definition data via the GUI 50 prior to generation of a prepopulated driver definition template. For instance, the discovery module 36 may be configured to dynamically generate the driver definition template after the user also submits user inputs 44 via the GUI 50 indicating the influencers and calculation logic for each target output. Responsive to thus receiving user inputs 44 indicating the target outputs, influencers, computation logic, and granularity dimensions, the discovery module 36 may be configured to generate a driver definition template having a table format with rows prepopulated with the target outputs and the influencers and calculation logic for each target output, and columns prepopulated with the granularity dimensions. Each target output and/or each influencer may be associated within the driver definition template with a dropdown list for each granularity dimension that is prepopulated with the structure of the granularity dimension, such as the members, generations, and groups of children of the granularity dimension. A user may then interact with the dropdown lists to define granularity definitions for each target output and influencer relative to each of the granularity dimensions.

In some instances, the discovery module 36 may also be configured to suggest, such as via the GUI 50 and/or within the driver definition template, dimensions of the multidimensional databases 32 to serve as the influencer and granularity dimensions for the target outputs, and members of such dimensions to serve as influencers and granularity definitions for the target outputs. To this end, the template database 46 may store data indicating previous driver definitions used to build validated custom applications. Responsive to receiving user inputs 44 identifying target outputs for a custom application, the discovery module 36 may be configured to query this data from the template database 46 to identify previous driver definitions that include at least one of the identified target outputs. The discovery module 36 may then be configured to determine whether the granularity and influencer dimensions for the at least one target output within the identified previous driver definitions match dimensions of the present multidimensional databases 32, which may be indicated in the retrieved master data 30, and whether the influencers and granularity definitions for the at least one target output within the identified previous driver definitions match members within the present multidimensional databases 32, such as those of the matching dimensions, which may also be indicated in the retrieved master data 30. The discovery module 36 may then be configured to suggest the matching dimensions, influencers, and granularity definitions, and the calculation logic associated with the matching influencers, for the driver definition of the custom application.

In some instances, an enterprise may not implement a master data source 28 containing the master data 30 for the enterprise. If the user indicates that no such master data source 28 is available, then the discovery module 36 may be configured to dynamically generate a master data template based on previously received user inputs 44, such as dimensions submitted by the user, that enables the user to manually enter a structure for each dimension (e.g., members, hierarchy, computation logic). In some instances, the template database 46 may store data indicating standard master data for various types of enterprises, and the discovery module 36 may be configured to prepopulate the master data template with the dimensions indicated by the user and a standard structure of those dimensions based on the standard master data stored in the template database 46 that corresponds to the type of enterprise of the user. The user may then interact with the master data template via the GUI 50 to add to, remove from, and modify the standard master data to fit the particular enterprise of the user.

FIG. 2 illustrates an exemplary driver definition template 70 that may have been dynamically generated on the fly by the discovery module 36 based on previously received user inputs 44 and thereafter completed by the user via the GUI 50 to define the driver definition configuration parameter for a custom application requested by the user. The driver definition template 70 may list target outputs 72 submitted for the requested application via the GUI 50, such as a net sales revenue target output 72A and a third party licensing revenue target output 72B. The driver definition template 70 may also set forth influencers 74 selected for each target output 72 via the GUI 50 and/or driver definition template 70. The influencers 74 may correspond to members of one or more dimensions of the multidimensional databases 32 tagged as influencer dimensions, such as dimensions of a measures type (e.g., accounts dimension). In the illustrated example, the influencers 74 selected for the net sales revenue target output 72A include a volume influencer 74A, a per unit price influencer 74B, a premium influencer 74C, and a military discount influencer 74D, and the influencers 74 selected for the third party licensing revenue target output 72B include a volume influencer 74E, a per unit fee influencer 74F, and an overhead influencer 74G.

The driver definition template 70 may also include computation logic 76 selected for the target outputs 72, such as via the GUI 50 and/or driver definition template 70, that indicates the relationships between the influencers 74 to the target outputs 72. More particularly, the computation logic 76 selected for each target output 72 may indicate a formula for determining the target output 72 from the influencers 74 defined for the target output 72. For instance, the computation logic 76 for the net sales revenue target output 72A may include a multiplication relationship 76A, an addition relationship 76B, and a subtraction relationship 76C, indicating that the net sales revenue target output 72A may be calculated as the volume influencer 74A multiplied by the per unit price influencer 74B plus the premium influencer 74C minus the military discount influencer 74D. As a further example, the computation logic 76 selected for the third party licensing revenue target output 72B may include a multiplication relationship 76D and an addition relationship 76E indicating that third party licensing revenue target output 72B may be calculated as the volume influencer 74E multiplied by the per unit fee influencer 74F plus the overhead influencer 74G.

The driver definition template 70 may also include granularity data 78 for the target outputs 72. The granularity data 78 may specify the granularity dimensions 80 selected for the custom application and, for each influencer 74, selected influencer granularity definitions 82 indicating what data in the multidimensional databases 32 to use for each influencer 74 in the calculation of the target outputs 72. More particularly, each influencer 74 may include multiple values within the multidimensional databases 32 each associated with a different combination members from one or more of the granularity dimensions 80. In other words, each influencer 74 may be broken down within the multidimensional databases 32 by members of the granularity dimensions 80.

In general, if the data values stored for a given influencer 74 vary within the multidimensional databases 32 as a function of the members of a given dimension, then the dimension may provide a level of granularity to the influencer 74, and may thus be listed as a granularity dimension 80 in the driver definition template 70. Alternatively, if the data values stored for a given influencer 74 within the multidimensional databases 32 do not vary as a function of the members of a given dimension, then the dimension may not provide any level of granularity for the influencer 74. The granularity dimensions 80 of the driver definition template 70 may include each dimension of the multidimensional databases 32 that provides a level of granularity to at least one of the influencers 74 of the driver definition template 70. Correspondingly, each granularity dimension 80 of the driver definition template 70 may not provide a level of granularity for every influencer 74.

For instance, referring to the example illustrated in FIG. 2, the per unit price influencer 74B may include levels of granularity within the multidimensional databases 32 relative to members of a product granularity dimension 80A, entity granularity dimension 80B, customer granularity dimension 80C, channel granularity dimension 80D, period granularity dimension 80E, currency granularity dimension 80F, and attribute granularity dimension 80G. In other words, the per unit price influencer 74B may be broken down by product, entity, customer, sales channel, period, currency, and attributes within the multidimensional databases 32. The volume influencer 74A may include levels of granularity within the multidimensional databases 32 by all of the above granularity dimensions 80 other than the currency granularity dimension 80F, and the premium influencer 74C and military discount influencer 74D may each include levels of granularity within the multidimensional databases 32 by all of the above granularity dimensions 80 other than the product granularity dimension 80A. In other words, volume may not be tracked by currency within the multidimensional databases 32, and premium and military discount may not be tracked by product within the multidimensional databases 32.

As previously described, a user may manually select the granularity dimensions 80 to populate the driver definition template 70, such as via user inputs 44 provided to the GUI 50. Additionally or alternatively, responsive to a user indicating an influencer 74 via the GUI 50, the discovery module 36 may be configured to suggest dimensions of the multidimensional databases 32 for the granularity dimensions 80 based on the retrieved master data 30 and/or the identification of the multidimensional databases 32. For instance, the discovery module 36 may be configured to make an API call to the multidimensional databases 32, such as using an EPM API 56 provided by the EPM system 26 hosting the multidimensional databases 32, and traverse through the multidimensional databases 32 to identify the dimensions by which the values of the influencer 74 vary. Additionally, or alternatively, the discovery module 36 may be configured to identify such dimensions from the master data 30, which may indicate dimensions that provide a level of granularity for each influencer 74. The discovery module 36 may also be configured to identify which dimensions of the multidimensional databases 32 to suggest as granularity dimensions 80 based on previous driver definitions stored in the template database 46, as described above. When generating the driver definition template 70 for data entry by the user, the discovery module 36 may be configured to prepopulate the driver definition template 70 with the suggested dimensions as the granularity dimensions 80 of the driver definition template 70, which may then be confirmed or modified by the user.

Responsive to the discovery module 36 generating and updating the GUI 50 with the driver definition template 70, a user may interact with the driver definition template 70 to select influencer granularity definitions 82 for each influencer 74. In some instances, responsive to determining a granularity dimension 80 for a given custom application, the discovery module 36 may be configured to determine the structure of the granularity dimension 80 within the multidimensional databases 32, including the members, hierarchy, and internal computation logic of the granularity dimension 80, such as based on the retrieved master data 30. Thereafter, when generating the driver definition template 70, the discovery module 36 may be configured to prepopulate the driver definition template 70 with potential influencer granularity definitions 82 for the granularity dimension 80 based on the determined structure. For instance, for each influencer 74, the driver definition template 70 may display a dropdown list for each granularity dimension 80 that lists each member, each generation, each parent node, and each group of children members under a parent node of the granularity dimension 80 as potential influencer granularity definitions 82 for the influencer 74 relative to the granularity dimension 80. A user may then interact with the dropdown lists for each influencer 74 to select a given member, generation, parent node, group of children, or a custom combination of members of each granularity dimension 80 to serve as the influencer granularity definition 82 for the influencer 74 relative to the granularity dimension 80.

As previously described, each granularity dimension 80 of the driver definition template 70 may not provide a level of granularity to every influencer 74 of the driver definition template 70 within the multidimensional databases 32. In this case, the user may interact with the driver definition template 70 to set the influencer granularity definition 82 for the influencer 74 relative to the granularity dimension 80 to a null indicator such as "none." Alternatively, the discovery module 36 may be configured to prepopulate the driver definition template 70 with such influencer granularity definitions 82 automatically, such as based on the master data 30 or parsing of the multidimensional databases 32 as described above. For a given granularity dimension 80, the influencer granularity definitions 82 may thus indicate the influencers 74 to which members of the granularity dimension 80 are applicable and influencers 74 to which members of the granularity dimension 80 are not applicable with respect to calculation of the target outputs 72. As described in more detail below, this data may enable the decision module 38 to determine how to structure the right hand side (RHS) of each equation generated by the decision module 38.

As previously described, the influencer granularity definitions 82 selected for an influencer 74 associated with a given target output 72 may indicate the values of the influencer 74 to use for calculating the target output 72. More particularly, the influencer granularity definitions 82 selected for an influencer 74 may indicate to use the value of the influencer 74 for each possible combination of members indicated in the influencer granularity definitions 82 within the multidimensional databases 32 to calculate the target output 72. If a given influencer granularity definition 82 indicates some level of granularity relative to a granularity dimension 80 (e.g., indicates one or more members of the granularity dimension 80), such influencer granularity definition 82 may be referred to as providing a nonzero level of granularity. Alternatively, if a given influencer granularity definition 82 indicates no level of granularity relative to a granularity dimension 80 (e.g., "none"), such influencer granularity definition 82 may be referred to as providing a null level of granularity.

For instance, referring to the example illustrated in FIG. 2, the influencer granularity definitions 82 set for the volume influencer 74A may indicate to calculate a net sales revenue target output 72A using the value of the volume influencer 74A for each combination of product (granularity definition 82A-1), entity (granularity definition 82B-1), customer (granularity definition 82C-1), channel (granularity definition 82D-1), and month (granularity definition 82E-1) within the multidimensional databases 32, but not with respect to any particular currency (granularity definition 82F-1) in the multidimensional databases 32. The influencer granularity definition 82G-1 for the volume influencer 74A may also indicate that the data used for the volume influencer 74A should be limited to data associated with the "DepA" attribute within the multidimensional databases 32. Any other values for the volume influencer 74A within the multidimensional databases 32 may be omitted from the calculation.

As a further example, the influencer granularity definitions 82 for the premium influencer 74C may indicate to calculate the net sales revenue target output 72A using the value of the premium influencer 74C within the multidimensional databases 32 for each combination of entity (granularity definition 82B-3), customer (granularity definition 82C-3), channel (granularity definition 82D-3), month (granularity definition 82E-3), and currency (granularity definition 82F-3) within the multidimensional databases 32, and not with respect to any particular product (granularity definition 82A-3). The influencer granularity definition 82G-3 for the premium influencer 74C may similarly indicate that the data used for the premium influencer 74C should be limited to data associated with the "DepA" attribute within the multidimensional databases 32.

The completed driver definition template 70 may thus represent an equation for each target output 72 indicated in the application definition 42. The left hand side (LHS) of the equation may be the target output 72, and the right hand side (RHS) of the equation may be defined by the influencers 74, computation logic 76, and granularity data 78 for the target output 72. Examples of such equations are described in more detail below.

In some instances, the granularity data 78 for each target output 72 may also indicate a target output granularity definition 84 for the target output 72 relative to each granularity dimension 80. The target output granularity definitions 84 may generally indicate the levels of granularity that should be output by the custom application for each target output 72. The user may interact with the driver definition template 70 to set the target output granularity definitions 84, such as similar to how the influencer granularity definitions 82 may be defined as described above (e.g., a prepopulated dropdown list for each granularity dimension 80).

Additionally, or alternatively, the driver definition template 70 may be configured to dynamically determine the target output granularity definitions 84 for each target output 72, such as based on the influencer granularity definitions 82 defined for the influencers 74 for the target output 72. For instance, responsive to a nonzero influencer granularity definition 82 (e.g., influencer granularity definition 82 other than "none") being set for a given target output 72 relative to a given granularity dimension 80, the driver definition template 70 may be configured to automatically set the target output granularity definition 84 for the given granularity dimension 80 to the set nonzero influencer granularity definition 82. The driver definition template 70 may also be configured to automatically limit the selectable options for the other influencer granularity definitions 82 for the target output 72 relative to the granularity dimension 80 to either the set influencer granularity definition 82 or "none." In this way, to the extent the influencer granularity definitions 82 for a target output 72 relative to a granularity dimension 80 indicate a nonzero level of granularity, such influencer granularity definitions 82 may all indicate the same nonzero level of granularity.

The discovery module 36 may be coupled to the decision module 38 and an application definition database 58. Responsive to capturing the application definition 42, the discovery module 36 may be configured to write the application definition 42 to the application definition database 58, and to communicate a notification to the decision module 38 that the application definition 42 is ready for processing. Responsive to receiving the notification, the decision module 38 may be configured to read the application definition from the application definition database 58, and to analyze the application definition 42 to automatically generate resource-efficient machine written code for querying the multidimensional databases 32 and providing the target outputs 72 defined by the application definition 42.

More particularly, the decision module 38 may be configured to automatically group the target outputs 72 into a plurality of mutually exclusive groups each including two or more of the target outputs 72 by applying a weighting algorithm to the application definition 42 that assigns influencer weights to each influencer 74 relative to the granularity dimensions 80 based on the influencer granularity definitions 82 for that influencer 74, assigns target output weights to each target output 72 relative to the granularity dimensions 80 that correspond to the influencer weights assigned to the influencers 74 for the target output 72, and identifies the target outputs 72 for each group based on the target output weights assigned to each target output 72. The decision module 38 may then be configured to dynamically generate machine written code that includes a distinct code block for each group of target outputs 72, the distinct code block for each group including a fixing portion and a calculating portion. The fixing portion may be generated based on the target output weights assigned to the target outputs 72 of the group and may be configured to retrieve a section of the multidimensional databases 32 corresponding to the target output weights assigned to the target outputs 72 of the group. The calculating portion may be generated based on the influencer weights assigned to the influencers 74 for the target outputs 72 of the group and may be configured to generate the target outputs 72 of the group based on the retrieved section.

To this end, the decision module 38 may include three distinct modules, namely, a weight-based logic (WbL) module 60, an automated matching sequence module (AMS) 62, and a driver-based decisions engine (DbDe) module 64. Each of these modules may be embodied by a distinct set of computer-executable instructions within the computer-executable instructions embodying the decision module 38.

The WbL module 60 may be configured to apply a weighting algorithm to the application definition 42 that determines and assigns an influencer weight 86 to each influencer 74 relative to each granularity dimension 80, such as based on the influencer granularity definition 82 set for the influencer 74 relative to the granularity dimension 80. Referring to FIG. 3, for example, the WbL module 60 may be configured to use a binary weighting system in which the WbL module 60 assigns one influencer weight 86 value (e.g., one) to each influencer granularity definition 82 indicating a nonzero level of granularity, and assigns another influencer weight 86 value (e.g., zero) for each influencer granularity definition 82 indicating a null level of granularity (e.g., "none"). The WbL module 60 may also be configured to generate and store a weight index 61 in the application definition database 58 that tracks the influencer granularity definitions 82 for which the former influencer weight 86 value is assigned. In particular, for each assigned influencer weight 86 of the former value, the WbL module 60 may be configured to generate an entry in the weight index 61 that indicates the influencer 74, granularity dimension 80, and influencer granularity definition 82 associated with the assigned influencer weight 86.

In some examples, the WbL module 60 may be configured to assign influencer weight 86 values other than or in addition to those described above. For instance, the WbL module 60 may be configured to assign a unique nonzero influencer weight 86 value to each influencer granularity definition 82 indicating a different member or group of members from the granularity dimensions 80, with each influencer granularity definition 82 indicating a same one or more members being assigned the same nonzero influencer weight 86 value. In this case, the WbL module 60 may be configured to generate entries in the weight index 61 that track the members or group of members corresponding to each assigned nonzero influencer weight 86 value.

Additionally or alternatively, the WbL module 60 may be configured to assign a unique nonzero influencer weight 86 value to each influencer granularity definition 82 that indicates the members of a different generation number of a granularity dimension 80, with each influencer granularity definition 82 that implicates a same generation number, regardless of the granularity dimension 80 associated with the influencer granularity definition 82, being assigned a same influencer weight 86 value. In this case, the WbL module 60 may be configured to generate entries in the weight index 61 that associates each assigned nonzero influencer weight 86 value with the generation number associated with the influencer weight 86 value.

Additionally or alternatively, the WbL module 60 may be configured to assign a unique nonzero influencer weight 86 value to each influencer granularity definition 82 corresponding to an influencer 74 including a calculation exception. More particularly, the GUI 50 and/or driver definition template 70 may enable a user to define exceptions for each influencer 74, such as part of the computation logic 76 for the influencer 74. Such exceptions may include conditional rules applied to the values of the influencer 74 within the multidimensional databases 32 relative to the calculation of the target output 72. For instance, if a user desires to calculate a target output 72 as a function of only the positive values of a given influencer 74 within the multidimensional databases 32, then the user may apply an exception to the influencer 74 that indicates, in connection with the target output 72, to determine whether the value of the influencer 74 for a given intersection of the granularity dimensions 80 is negative. If so, then the exception may indicate to set the value to zero for the purposes of calculating the target output 72.

For each influencer 74 to which a given exception applies, the WbL module 60 may be configured to assign a unique nonzero influencer weight 86 value to each influencer granularity definition 82 for the influencer 74 indicating a nonzero level of granularity. More particularly, influencer granularity definitions 82 for influencers 74 with a same exception and indicating a same one or more members of a granularity dimension 80 may be assigned a same nonzero influencer weight 86 value, and influencer granularity definitions 82 for influencers 74 with a same exception but indicating a different one or more members of a granularity dimensions 80 may be assigned different nonzero influencer weight 86 values. Moreover, the nonzero influencer weight 86 value assigned to an influencer granularity definition 82 for an influencer 74 with no exception and indicating one or more members of a granularity dimension 80 may differ from the nonzero influencer weight 86 value assigned to an influencer granularity definition 82 for an influencer 74 with an exception and indicating the same one or more members of the granularity dimension 80, and the nonzero influencer weight 86 value assigned to an influencer granularity definition 82 for an influencer 74 with one exception and indicating one or more members of a granularity dimension 80 may differ from the nonzero influencer weight 86 value assigned to an influencer granularity definition 82 for an influencer 74 with a different exception and indicating the same one or more members of the granularity dimension 80. In this case, the WbL module 60 may be configured to generate entries in the weight index 61 that track the members or group of members and the influencer 74 exception, if any, corresponding to each assigned nonzero influencer weight 86 value.

The WbL module 60 may also be configured to assign a target output weight 88 to each target output 72 relative to each granularity dimension 80 that corresponds to the influencer weights 86 assigned to the influencers 74 for the target output 72. For instance, the WbL module 60 may be configured to assign the target output weights 88 based on the target output granularity definitions 84 defined for each target output 72 in a manner similar to how the influencer weights 86 are assigned. As an example, when the binary weighting system is used, the WbL module 60 may be configured to assign a value of zero to each target output granularity definition 84 indicating a null level of granularity, and assign one to each target output granularity definition 84 indicating a nonzero level of granularity.

As a further example, the WbL module 60 may be configured to assign the target output weights 88 based on the target output granularity definitions 84 defined for each target output 72 and the influencer weights 86 assigned to the influencers 74 for the target output 72, such as indicated in the weight index 61. For instance, if a given influencer granularity definition 82 and target output granularity definition 84 implicate a same one or more members of a granularity dimension 80, the WbL module 60 may be configured to assign the influencer weight 86 value indicated in the weight index 61 for the one or more members as the target output weight 88 value for the given target output granularity definition 84.

As another example, the WbL module 60 may be configured to set the target output weight 88 for each target output 72 relative to each granularity dimension 80 as one of the influencer weights 86, such as the highest influencer weight 86, assigned to the influencers 74 for the target output 72 relative to the granularity dimension 80 that corresponds to a nonzero level of granularity. For instance, referring to the example illustrated in FIG. 3, the WbL module 60 may be configured to set the target output weight 88A-1 for the net sales revenue target output 72A to the highest of the influencer weights 86A-1 through 86A-4 (e.g., one).

As described in more detail below, the decision module 38 may be configured to dynamically generate resource-efficient machine written code for generating the target outputs 72 based on the assigned influencer weights 86 and target output weights 88. In some examples, the WbL module 60 may be configured to assign influencer weights 86 and target output weights 88 relative to all the granularity dimensions 80 other than any attribute granularity dimensions 80G. The members of an attribute granularity dimension 80G may be assigned to the members of the other granularity dimensions 80 within the multidimensional databases 32 to further characterize the data stored in connection with the members of the other granularity dimensions 80. When the WbL module 60 is configured to assign influencer weights 86 and target output weights 88 relative to all the granularity dimensions 80 other than any attribute granularity dimensions 80G, the decision module 38 may be configured to generate the resource-efficient machine written code based on the assigned influencer weights 86 and target output weights 88, and the attribute influencer granularity definitions 82G and attribute target output granularity definitions 84G set for the attribute granularity dimensions 80G, if present.

After assigning the influencer weights 86 and target output weights 88, the WbL module 60 may pass control to the AMS module 62, which may generally be configured to create a weightage for each target output 72 and influencer 74 based on the combination of modules selected, Boolean selections, hierarchies, and/or other user and machine calculated inputs. For instance, the AMS module 62 may be configured generate a weighted influencer identifier 90 for each influencer 74 based on the influencer weights 86 assigned to the influencer 74, and generate a weighted target output identifier 92 for each target output 72 based on the target output weights 88 assigned to the target output 72. Being based on the influencer weights 86, the weighted influencer identifier 90 assigned to each influencer 74 for a target output 72 may indicate the level of data granularity to use for the influencer 74 relative to calculation of the target output 72. Similarly, the weighted target output identifier 92 assigned to each target output 72 may indicate the level of data granularity desired for the target output 72.

In some examples, the AMS module 62 may be configured to generate each weighted influencer identifier 90 for each influencer 74 by forming a string including each of the influencer weights 86 assigned to the influencer 74. If the driver definition also includes one or more attribute influencer granularity definitions 82G for an influencer 74 indicating attributes from one or more attribute granularity dimensions 80G to use for the influencer 74, the AMS module 62 may also be configured to append the indicated attributes to the influencer weights 86 as part of the weighted influencer identifier 90 for the influencer 74.

The influencer weights 86 and/or attributes of each weighted influencer identifier 90 may be arranged in a same order relative to the granularity dimensions 80. For instance, referring to the example illustrated in FIG. 3, each weighted influencer identifier 90 for each influencer 74 may list the influencer weights 86 and attributes of the influencer 74 in the following order: the influencer weight 86A for the product granularity dimension 80A, the influencer weight 86B for the entity/location granularity dimension 80B, the influencer weight 86C for the customer/dealer granularity dimension 80C, the influencer weight 86D for the channel granularity dimension 80D, the influencer weight 86E for the period granularity dimension 80E, the influencer weight 86F for the currency granularity dimension 80F, and the attribute indicated in the attribute influencer granularity definition 82G for the attribute granularity dimension 80G. The AMS module 62 may be configured to generate each weighted target output identifier 92 for each target output 72 in a same manner and order as the weighted influencer identifiers 90 for the influencers 74.

Responsive to assigning the weighted target output identifiers 92 to the target outputs 72, the AMS module 62 may be configured to automatically group the target outputs 72 into mutually exclusive groups based on the weighted target output identifiers 92. Each group may include two or more of the target outputs 72 calculated at a same or similar level of granularity, such as according to the weighted target output identifiers 92. For instance, the AMS module 62 may be configured to identify and group target outputs 72 having the same weighted target output identifiers 92. The decision module 38, or more particularly the DbDe module 64, may then be configured to leverage this information to dynamically write resource-efficient code for the requested custom application.

Thus, responsive to assigning the weighted identifiers 90, 92 and grouping the target outputs 72, the AMS module 62 may pass control to the DbDe module 64, which may generally be configured to analyze the system generated data, coupled with information supplied by user input, and synthesize/create recommendations using the complex weighted schematic to provide improved accuracy across a range of predictive outputs. More particularly, the DbDe module 64 may be configured to dynamically generate resource-efficient machine written source code for querying data from the multidimensional databases 32 and generating the target outputs 72 based thereon, such as based on the influencers 74, computation logic 76, and weighted identifiers 90, 92 determined for each target output 72. The DbDe module 64 may then be configured to generate one or more artifacts 66 for the requested application including the machine written source code. The artifacts 66 may include one or more of XML, JSON, XPAD, CSV, rule, and any other file format compatible with the target platform 14.

In particular, the DbDe module 64 may be configured to generate a distinct code block for each group of target outputs 72. The distinct code block for each group may include a fixing portion and a calculating portion. The DbDe module 64 may be configured to generate the fixing portion of each code block based on the target output weights 88 and/or attribute target output granularity definitions 84G, or more particular based on the weighted target output identifiers 92, assigned to each target output 72 corresponding to the code block. The DbDe module 64 may be configured to generate the calculating portion of each code block based on the influencers 74, computation logic 76, and the influencer weights 86 and/or attribute influencer granularity definitions 82, or more particularly on the weighted influencer identifiers 90, for each target output 72 corresponding to the code block.

The fixing portion of each code block may be configured to retrieve into memory a section or "slice" of the multidimensional databases 32 defined by the target output weights 88 and/or attribute target output granularity definitions 84G, or more particularly the weighted target output identifiers 92, assigned to the target outputs 72 corresponding to the code block. In particular, the weighted target output identifier 92 assigned to each target output 72 for a given code block may indicate which granularity dimensions 80 are applicable to calculating the target output 72 (e.g., by virtue of the weighted target output identifier 92 including a nonzero target output weight 88 for the granularity dimension 80), and correspondingly, which are not applicable (e.g., by virtue of the weighted target output identifier 92 including a target output weight 88 value of zero for the granularity dimension 80). For each granularity dimension 80 indicated as applicable, the weighted target output identifier 92 may also indicate the members and/or member groups (e.g., generations) of the granularity dimension 80 that are applicable to the target output 72, such as via an association between the nonzero target output weight 88 for the granularity dimension 80 and the applicable members and/or groups in the weight index 61, as described above.

The DbDe module 64 may thus be configured to dynamically generate the fixing portion of each code block by determining each granularity dimension 80 applicable to the target outputs 72 corresponding to the code block based on the weighted target output identifiers 92 assigned to the target outputs 72, and determining the members and/or member groups of the applicable granularity dimensions 80 that are applicable to the target outputs 72 by querying the weight index 61 with the nonzero target output weights 88 indicated in the weighted target output identifiers 92 assigned to the target outputs 72. The DbDe module 64 may then be configured to generate the fixing portion of the code block so that the section of the multidimensional database 32 retrieved by the fixing portion is limited to or consists of data within the multidimensional databases 32 corresponding to the granularity dimensions 80, members, and/or groups determined applicable to the target outputs 72. In other words, the fixing portion of each code block may be configured to obtain data within the multidimensional databases 32 for each possible combination of the members of the granularity dimensions 80 indicated as applicable to the target outputs 72 corresponding to the code block by the weighted target output identifiers 92 assigned to the target outputs 72. The calculating portion of each code block may then be configured to operate on the data received by the fixing portion to generate all of the target outputs 72 corresponding to the code block while avoiding querying and processing other data stored in the multidimensional databases 32 that is not relevant to the target outputs 72.

Grouping code for multiple target outputs 72 in this manner limits processing of the grouped target outputs 72 to those data cells of the multidimensional databases 32 corresponding to the level of granularity indicated for the target outputs 72 within the driver definition for the custom application, and thus minimizes the number of passes through the cells of the multidimensional databases 32 to generate the target outputs 72 of the custom application. Correspondingly, such groupings improve the speed of the resulting application and reduce hardware resources used by the resulting application when querying for and processing data from the multidimensional databases 32 to provide the target outputs 72.

The DbDe module 64 may be configured to generate the calculating portion of each code block by being configured to generate an equation for calculating each target output 72 corresponding to the code block based on the influencers 74, computation logic 76, and weighted influencer identifiers 90 assigned to the influencers 74 for the target output 72. More specifically, similar to the weighted target output identifiers 92, the weighted influencer identifier 90 for each influencer 74 may indicate which of the granularity dimensions 80 are applicable and are not applicable to that influencer 74, and also may indicate which of the members and/or member groups of the applicable granularity dimensions 80 are applicable to that influencer 74, such as via the weight index 61. The DbDe module 64 may thus be configured to generate an equation for each target output 72 corresponding to a code block by being configured to determine the granularity dimensions 80, members, and/or member groups applicable to each influencer 74 for the target output 72 by querying the weight index 61 with the nonzero influencer weights 86 of the weighted influencer identifier 90 assigned to the influencer 74, and generate code for each influencer 74 for the target output 72 that indicates an intersection of the influencer 74 with the members of the granularity dimensions 80 determined as applicable to the influencer 74. The DbDe module 64 may then be configured to combine the generated intersections based on the computation logic 76 for the target output 72.

For instance, referring to the example illustrated in FIG. 3, the AMS module 62 may have grouped the net sales revenue target output 72A and the third party licensing revenue target output 72B based on the same weighted target output identifier 92 being assigned to each of these target outputs 72. The DbDe module 64 may then be configured to generate the following code block for this group based on the influencers 74, computation logic 76, weighted target output identifier 92, and weighted influencer identifiers 90 for the target outputs 72:

analyzing the various target outputs 72, such as providing what if scenarios, long range planning, variance analysis, and rolling forecasts relative to the target outputs 72. The code template database 68 may also store exception code templates each including expandable code for implementing an exception applied to an influencer 74 as described above.

The DbDe module 64 may thus be configured to retrieve the expandable code templates corresponding to the current configuration parameters and/or applied influencer exceptions, such as indicated by the weighted influencer identifiers 90 in combination with the weight index 61 as described above, to dynamically generate machine written code by inserting the configuration parameters into the retrieved code. The DbDe module 64 may then be configured to integrate the machine written code into the previously described code blocks and/or one or more additional artifacts 66. For instance, the DbDe module 64 may be configured to integrate any eliminations strategy code, currency-related code, and influencer exception code into the calculating portions of the pertinent code blocks. The DbDe module 64 may be configured to integrate model-related code as additional artifacts 66.

The DbDe module 64 may be configured to communicate the generated artifacts 66 to the deployment module 40. The deployment module 40 may be configured to feed off the data output from DbDe module 64 and other text, Boolean and data file inputs, such as from the application definition 42, to generate an application package 96. To this end, the deployment module 40 may also be coupled to the code template database 68, which may additionally store code templates for generating the application package 96 from the artifacts 66 received from the decision module 38 and data items from the application definition 42. In addition to the machine written code, the application package 96 generated by the deployment module 40 may include metadata for the custom application based on the application definition 42. Such metadata may indicate application settings such as start years, currencies used, and dimension names written into XML, JSON, XPAD, CSV and/or other files readable by the target platform 14.

---

Fix(All Products, All Locations, All Customers, All Channels, All Months, All Currencies, DepA)

Net Sales Revenue = Volume -> Product -> Location -> Customer -> Channel -> Month -> DepA -> No Currency * Per Unit Price -> Product -> Location -> Customer -> Channel -> Month -> Currency -> DepA + Premium -> Location -> Customer -> Channel -> Month -> Currency -> DepA -> No Product – Military Discount -> Location -> Customer -> Channel -> Month -> Currency -> DepA -> No Product;
Third party Licensing Revenue = Volume -> Product -> Location -> Customer -> Channel -> Month -> DepA -> No Currency * Per Unit Price -> Product-> Location -> Customer -> Channel -> Month -> Currency -> DepA + Overhead -> Location -> Customer -> Channel -> Month -> Currency -> DepA -> No Product;
End fix

---

The DbDe module 64 may also be configured to dynamically generate additional code for each code block and/or artifacts 66 based on other application configuration parameters, such as the currency related parameters, eliminations strategy parameter, application type parameter, and security matrix parameter. To this end, the DbDe module 64 may be coupled to a code template database 68 that includes code templates for each of these other configuration parameters. Each code template may include expandable code that the DbDe module 64 may retrieve and customize to the configuration parameters of the application definition 42. For instance, the code template database 68 may store model code templates each including expandable code for further Responsive to generating the application package 96, the deployment module 40 may be configured to deploy the application package 96 to the target platform 14, or more particularly the EPM system 26, for validation and execution against the multidimensional databases 32. More specifically, the deployment module 40 may be configured to initiate an API call to the EPM system 26 via the EPM API 56 to transfer the application package 96 to the EPM system 26, and to then cause the EPM system 26 to execute the application package 96 on the multidimensional databases 32. Responsive to such execution, the EPM system 26 may be configured to generate target output files corresponding to the target outputs 72 and a log file indicating any errors encountered by the EPM system 26 when executing the application package 96. The deployment module 40 may then be configured to check the log file for errors and apply error checking to the target output files, such as by validating the target output files against the configuration parameters of the application definition 42 and/or the metadata of the application package 96.

During operation of the decision module 38 and the deployment module 40, the application creation engine 34 may be configured to cause the frontend portal 48 to display a status bar on the user device 12 that indicates a running completion percentage of the custom application. Responsive to the deployment module 40 discovering no validation errors, the deployment module 40 may be configured to turn the status bar green to indicate that the custom application is ready for execution on the target platform 14 by the user. Alternatively, responsive to the deployment module 40 discovering validation errors, the deployment module 40 may be configured to turn the status bar red and indicate the discovered errors to the user, who may then address the errors, such as by revising the configuration parameters of the application definition 42.

Figure 4:
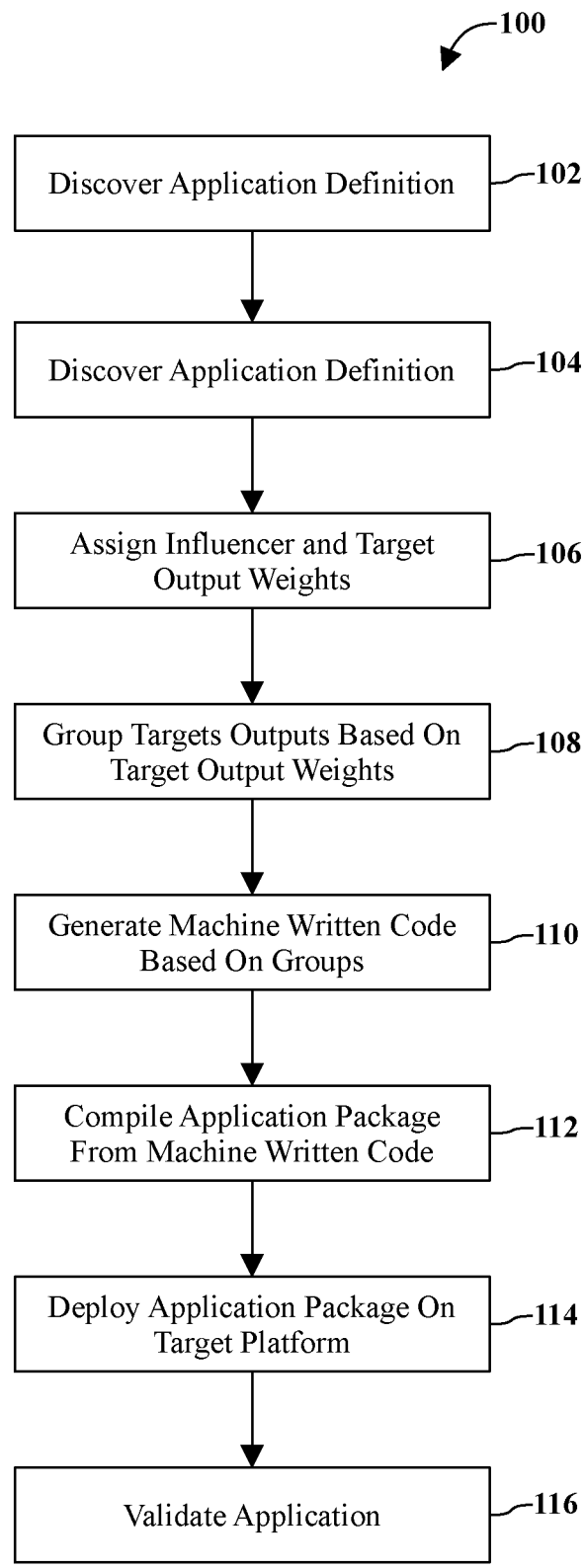
FIG. 4 illustrates a method for dynamically and automatically generating custom applications for execution in multidimensional database environments.

FIG. 4 illustrates a method 100 for generating custom applications for operation in a multidimensional database environment, such as the target platform 14 or the EPM system 26. The application creation engine 34 may be configured to implement the method 100, such as upon execution of the set of computer-executable instructions embodying the application creation engine 34 by at least one processor of the application builder server 16. Each of the blocks of the method 100 may be implemented with any one or more of the features corresponding to the functions of the block that are described above.

In block 102, a request to build a custom application for querying one or more multidimensional databases 32 of a target platform 14 may be received, such as by the discovery module 36 from the user device 12. In block 104, an application definition 42 for the custom application may be discovered, such as by the discovery module 36. For instance, an API call to a master data source 28 associated with the multidimensional databases 32 may be made to retrieve master data 30 from the master data source 28 that indicates a hierarchical structure of the multidimensional databases 32. The application definition 42 may then be determined based on the retrieved master data 30 and one or more user inputs 44. The application definition 42 may indicate target outputs 72 to be produced by the custom application based on data stored in the multidimensional databases 32, influencers 74 for each of the target outputs 72 that correspond to members of one or more influencer dimensions of the multidimensional databases 32, and influencer granularity definitions 82 relative to granularity dimensions 80 of the multidimensional databases 32 for each of the influencers 74.

In some examples, each granularity dimension 80 may include members within the multidimensional databases 32 that are organized into mutually exclusive generations of the granularity dimension 80 each corresponding to a different distance from a root node of the granularity dimension 80, and the application definition 42 may be discovered by generating a GUI 50 with fields for receiving identification of the target outputs 72, influencers 74, and granularity dimensions 80. Responsive to receiving this data, a driver definition template 70 for defining the influencer granularity definitions 82 and/or target output granularity definitions 84 relative to the granularity dimensions 80 of the multidimensional databases 32 may be dynamically generated. The generations of each granularity dimension 80 may also be determined from the retrieved master data 30, and the driver definition template 70 may be prepopulated with the determined generations by associating a dropdown list for each granularity dimension 80 with each influencer 74 and/or each target output 72 within the driver definition template 70. Each dropdown list may include the generations determined for the granularity dimension 80 associated with the dropdown list as selectable options for defining an influencer granularity definition 82 and/or target output granularity definition 84. The GUI 50 may then be updated with the prepopulated driver definition template 70 for user selections.

The method 100 may thereafter group the target outputs 72 into a plurality of mutually exclusive groups each including two or more of the target outputs 72 by applying a weighting algorithm to the application definition 42 that assigns influencer weights 86 to each influencer 74 relative to the granularity dimensions 80 based on the influencer granularity definitions 82 for the influencer 74, assigns target output weights 88 to each target output 72 relative to the granularity dimensions 80 that correspond to the influencer weights 86 assigned to the influencers 74 for the target output 72, and identifies the target outputs 72 for each group based on the target output weights 88 assigned to each target output 72.

To this end, in block 106, the influencer weights 86 and target output weights 88 may be assigned respectively to the influencers 74 and target outputs 72, such as described above. For instance, each target output weight 88 assigned to a given target output 72 may correspond to a different one of the granularity dimensions 80, and the target output weight 88 assigned to each target output 72 may be set to the greatest influencer weight 86 assigned to the influencers 74 for the target output 72 relative to the granularity dimension 80 to which the target output weight 88 corresponds.

Thereafter, in block 108, the target outputs 72 may be grouped into a plurality of mutually exclusive groups each including two or more of the target outputs 72 based on the target output weights 88 assigned to each target output 72. For instance, a weighted target output identifier 92 may be generated for each target output 72 based on the target output weights 88 assigned to the target output 72, and the target outputs 72 having a same weighted target output identifier 92 may be grouped together. A weighted influencer identifier 90 may also be generated for each influencer 74 for each target output 72 based on the influencer weights 86 assigned to the influencer 74.

In block 110, resource-efficient machine written code may be dynamically generated based on the groupings. More particularly, machine-written code may be generated that includes a distinct code block for each group of target outputs 72, the distinct code block for each group including a fixing portion and a calculating portion. The fixing portion of the code block for each group may be generated based on the target output weights 88 and/or weighted target output identifier 92 assigned to the target outputs 72 of the group, and may be configured to retrieve a section of the multidimensional databases 32 corresponding to the target output weights 88 and/or weighted target output identifier 92 assigned to the target outputs 72 of the group. The calculating portion of the code block for each group may be generated based on the influencer weights 86 and/or weighted influencer identifiers 90 assigned to the influencers 74 for the target outputs 72 of the group, and may be configured to generate the target outputs 72 of the group based on the retrieved section of the multidimensional databases 32.

In some examples and as described above, the weighted target output identifier 92 generated for each target output 72 may indicate which of the granularity dimensions 80 are applicable to the target output 72 with at least one of the granularity dimensions 80 being indicated as applicable to the target output 72, and the fixing portion of the code block for each group may be dynamically generated such that the section of the multidimensional databases 32 retrieved by the fixing portion is limited to data within the multidimensional databases 32 corresponding to the at least one granularity dimension 80 indicated as applicable by the weighted target output identifier 92 generated for each target output 72 of the group.

In addition or alternatively, and as described above, each granularity dimension 80 may include members within the multidimensional databases 32, and the weighted target output identifier 92 generated for each target output 72 may indicate which of the members of the granularity dimensions 80 are applicable to the target output with at least one of the members of the granularity dimensions 80 being indicated as applicable to the target output 72. In this example, the fixing portion of the code block for each group may be dynamically generated such that the section of the multidimensional databases 32 retrieved by the fixing portion is limited to data within the multidimensional databases 32 corresponding to the at least one member indicated as applicable by the weighted target output identifier 92 generated for each target output 72 of the group.

In addition or alternatively, and as described above, the members of each granularity dimension 80 may be organized into mutually exclusive generations of the granularity dimension 80 each corresponding to a different distance from a root node of the granularity dimension 80, and the weighted target output identifier 92 generated for each target output 72 may indicate which of the generations of the granularity dimensions 80 are applicable to the target output 72 with at least one of the generations of the granularity dimensions 80 being indicated as applicable to the target output 72. In this example, the fixing portion of the code block for each group may be dynamically generated such that the section of the multidimensional databases 32 retrieved by the fixing portion is limited to data within the multidimensional databases 32 corresponding to the at least one generation indicated as applicable by the weighted target output identifier 92 generated for each target output 72 of the group.

In some examples and as described above, the application definition 42 may also indicate computation logic 76 for each target output 72 that defines a relationship between the influencers 74 for the target output 72 and the target output 72, and the calculating portion of the code block for each group may be generated by dynamically generating machine written code for deriving each target output 72 of the group based on the computation logic 76 for the target output 72 and the weighted target output identifier generated for each influencer 94 for the target output 72. In some examples, each granularity dimension 80 may include members within the multidimensional databases 32, and the weighted influencer identifier 90 generated for each influencer 74 for each target output 72 may indicate which of the members of the granularity dimensions 80 are applicable to the influencer 74 with at least one of the members of the granularity dimensions 80 being indicated as applicable to the influencer 74. In this case, the machine written code for deriving each target output 72 based on the computation logic 76 for the target output 72 and the weighted influencer identifier 90 generated for each influencer 74 for the target output 72 may be dynamically generated by generating machine written code for each influencer 74 for the target output 72 that provides an intersection of the influencer 74 and the at least one member indicated as applicable to the influencer 74 by the weighted influencer identifier 90 generated for the influencer 74, and combining the machine written code generated for each influencer 74 for the target output 72 based on the computation logic 76 for the target output.

In block 112, the machine written code including a distinct code block for each group may be compiled, such as by the deployment module 40 as described above, into an application package 96 corresponding to the target platform 14 that is configured to query data from the multidimensional databases 32 and generate the target outputs 72 based on the queried data according to the code blocks. In block 114, the application package 96 may be deployed, such as by the deployment module 40 as described above, to the target platform 14 for execution on the multidimensional databases 32. In block 116, the application package 96 may then be executed and validated, such as by the deployment module 40 as described above.

Figure 5:
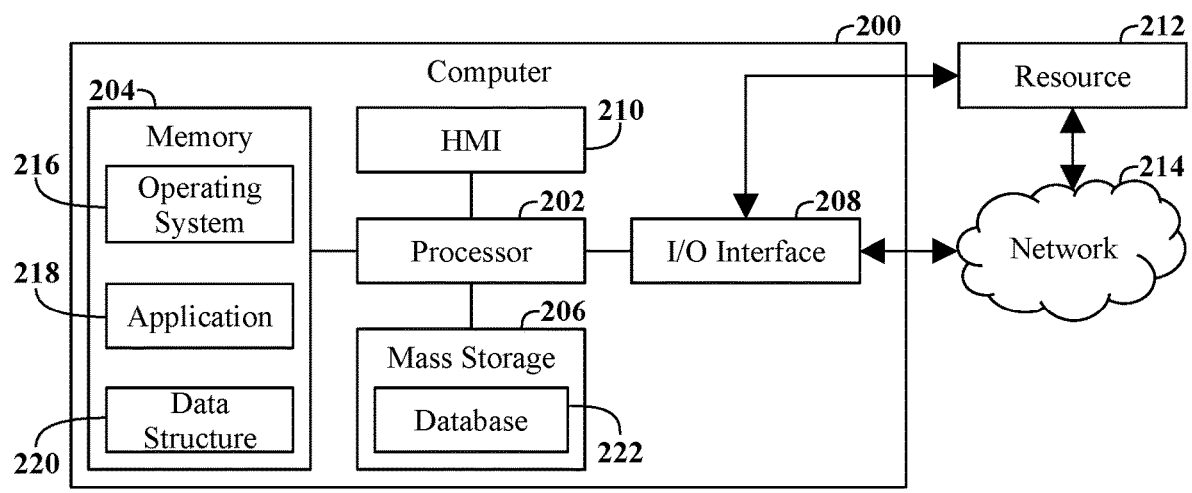
FIG. 5 illustrates a computing environment that may be used to implement components of the operating environment of FIG. 1 and the method of FIG. 4.

The components of the operating environment 10 of FIG. 1 and the blocks of the method 100 of FIG. 4 may each be implemented by one or more computing devices, such as the computing system 200 illustrated in FIG. 5. Each component or block may be implemented by a single computing device or multiple computing devices cooperating in a distributed environment, and two or more the components or blocks may be implemented by a same one or more computing devices. For instance, the MDM server 20, EPM server 24, and/or application builder server 16 may each be provided via multiple computing devices arranged in a distributed environment that collectively provide the functionality of the component described herein. As a further example, the MDM server 20 and EPM server 24 may be implemented by a same one or more computing devices.

FIG. 5 illustrates an exemplary computing system 200 that may provide a suitable computing environment for implementing the devices, systems, components, features, processes, methods, and modules described above. The computing system 200 may include a processor 202, a memory 204, a mass storage memory device 206, an input/output (I/O) interface 208, and a Human Machine Interface (HMI) 210. The computing system 200 may also be operatively coupled to one or more external resources 212 via the network 214 or I/O interface 208. External resources 212 may include, but are not limited to, servers, databases, mass storage devices, peripheral devices, cloud-based network services, or any other suitable computer resource that may be used by the computing system 200.

The processor 202 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 204. The memory 204 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 206 may include data storage devices such as a hard drive, optical drive, tape drive, non-volatile solid state device, or any other device capable of storing information.

The processor 202 may operate under the control of an operating system 216 that resides in the memory 204. The operating system 216 may manage computer resources so that computer program code embodied as one or more computer software applications, such as an application 218 residing in memory 204, may have instructions executed by the processor 202. In an alternative example, the processor 202 may execute the application 218 directly, in which case the operating system 216 may be omitted. One or more data structures 220 may also reside in memory 204, and may be used by the processor 202, operating system 216, or application 218 to store or manipulate data.

The I/O interface 208 may provide a machine interface that operatively couples the processor 202 to other devices and systems, such as the network 214 or the one or more external resources 212. The application 218 may thereby work cooperatively with the network 214 or the external resources 212 by communicating via the I/O interface 208 to provide the various features, functions, applications, processes, or modules described above. The application 218 may also have program code that is executed by the one or more external resources 212, or otherwise rely on functions or signals provided by other system or network components external to the computing system 200.

The HMI 210 may be operatively coupled to the processor 202 of computing system 200 in a known manner to allow a user to interact directly with the computing system 200. The HMI 210 may include video or alphanumeric displays, a touch screen, a speaker, and any other suitable audio and visual indicators capable of providing data to the user. The HMI 210 may also include input devices and controls such as an alphanumeric keyboard, a pointing device, keypads, pushbuttons, control knobs, microphones, etc., capable of accepting commands or input from the user and transmitting the entered input to the processor 202.

A database 222 may reside on the mass storage memory device 206, and may be used to collect and organize data used by the various systems and modules described herein. The database 222 may include data and supporting data structures that store and organize the data. In particular, the database 222 may be arranged with any database organization or structure including, but not limited to, a relational database, a hierarchical database, a network database, or combinations thereof. A database management system in the form of a computer software application executing as instructions on the processor 202 may be used to access the information or data stored in records of the database 222 in response to a query, where a query may be dynamically determined and executed by the operating system 216, other applications 218, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for generating custom applications for querying a multidimensional database of a target platform, the system comprising:
    at least one processor; and
    at least one memory device storing computer-executable instructions that upon execution by the at least one processor cause the at least one processor to:
        receive a request to build a custom application for querying a multidimensional database of a target platform, the multidimensional database stored at the at least one memory device;
        discover an application definition for the custom application by:
            making an API call to a master data source associated with the multidimensional database to retrieve master data that indicates a hierarchical structure of the multidimensional database; and
            determining the application definition based on the retrieved master data, the application definition indicating target outputs to be produced by the custom application based on data stored in the multidimensional database, influencers for each of the target outputs that correspond to members of one or more first dimensions of the multidimensional database, and granularity definitions relative to second dimensions of the multidimensional database for each of the influencers;
        automatically group the target outputs into a plurality of mutually exclusive groups each including two or more of the target outputs by applying a weighting algorithm to the application definition that:
            assigns first weights to each influencer relative to the second dimensions based on the granularity definitions for the influencer;
            assigns second weights to each target output relative to the second dimensions that correspond to the first weights assigned to the influencers for the target output; and
            identifies the target outputs for each respective mutually exclusive group based on the second weights assigned to each target output;
        for each respective mutually exclusive group of the plurality of mutually exclusive groups, dynamically generate machine written code comprising a distinct code block for the respective mutually exclusive group by:
            generating a first portion of the distinct code block based on the second weights assigned to the target outputs of the respective mutually exclusive group, the first portion of the distinct code block configured to retrieve a corresponding section of the multidimensional database for the respective mutually exclusive group and limit data retrieval to only the corresponding section of the multidimensional database based on the second weights assigned to the target outputs of the group; and
            generating a second portion of the distinct code block based on the first weights assigned to the influencers for the target outputs of the respective mutually exclusive group, the second portion of the distinct code block configured to generate the target outputs of the respective mutually exclusive group based on the corresponding section of the multidimensional database;
        compile the machine written code into an application package corresponding to the target platform, the application package configured to query data from the multidimensional database and generate the target outputs by executing the distinct code blocks for each respective mutually exclusive group of the plurality of mutually exclusive groups; and
        deploy the application package to the target platform for execution on the multidimensional database.

2. The system of claim 1, wherein the computer-executable instructions upon execution cause the at least one processor to identify the target outputs for each respective mutually exclusive group via the weighting algorithm by causing the at least one processor to:
    generate a weighted identifier for each target output based on the second weights assigned to the target output; and
    group the target outputs having a same weighted identifier.

3. The system of claim 2, wherein the weighted identifier generated for each target output indicates which of the second dimensions are applicable to the target output with at least one of the second dimensions being indicated as applicable to the target output, and the computer-executable instructions upon execution cause the at least one processor to dynamically generate the first portion of the distinct code block for each respective mutually exclusive group such that the corresponding section of the multidimensional database retrieved by the first portion is limited to data within the multidimensional database corresponding to the at least one of the second dimensions indicated as applicable by the weighted identifier generated for each target output of the respective mutually exclusive group.

4. The system of claim 2, wherein each second dimension comprises members within the multidimensional database, the weighted identifier generated for each target output indicates which of the members of the second dimensions are applicable to the target output with at least one of the members of the second dimensions being indicated as applicable to the target output, and the computer-executable instructions upon execution cause the at least one processor to dynamically generate the first portion of the distinct code block for each respective mutually exclusive group such that the corresponding section of the multidimensional database retrieved by the first portion is limited to data within the multidimensional database corresponding to the at least one of the members indicated as applicable by the weighted identifier generated for each target output of the respective mutually exclusive group.

5. The system of claim 2, wherein the members of each second dimension are organized into mutually exclusive generations of the second dimension each corresponding to a different distance from a root node of the second dimension, the weighted identifier generated for each target output indicates which of the generations of the second dimensions are applicable to the target output with at least one of the generations of the second dimensions being indicated as applicable to the target output, and the computer-executable instructions upon execution cause the at least one processor to dynamically generate the first portion of the distinct code block for each respective mutually exclusive group such that the corresponding section of the multidimensional database retrieved by the first portion is limited to data within the multidimensional database corresponding to the at least one of the generations indicated as applicable by the weighted identifier generated for each target output of the respective mutually exclusive group.

6. The system of claim 1, wherein each second weight assigned to each target output corresponds to a different one of the second dimensions, and the computer-executable instructions upon execution cause the at least one processor to set each second weight assigned to each target output to the greatest first weight assigned to the influencers for the target output relative to the second dimension to which the second weight corresponds.

7. The system of claim 1, wherein the application definition indicates computation logic for each target output that defines a relationship between the influencers for the target output and the target output, and the computer-executable instructions upon execution cause the at least one processor to dynamically generate as the second portion of the distinct code block for each respective mutually exclusive group machine written code for deriving each target output of the respective mutually exclusive group based on the computation logic for the target output and the first weights assigned to each influencer for the target output relative to the second dimensions.

8. The system of claim 7, wherein the computer-executable instructions upon execution cause the at least one processor to:
generate via the weighting algorithm a weighted identifier for each influencer for each target output based on the first weights assigned to the influencer; and
dynamically generate as the second portion of the distinct code block for each respective mutually exclusive group machine written code for deriving each target output of the respective mutually exclusive group based on the computation logic for the target output and the weighted identifier generated for each influencer for the target output.

9. The system of claim 8, wherein each second dimension comprises members within the multidimensional database, the weighted identifier generated for each influencer for each target output indicates which of the members of the second dimensions are applicable to the influencer with at least one of the members of the second dimensions being indicated as applicable to the influencer, and the computer-executable instructions upon execution cause the at least one processor to dynamically generate the machine written code for deriving each target output based on the computation logic for the target output and the weighted identifier generated for each influencer for the target output by causing the at least one processor to:

generate machine written code for each influencer for the target output that provides an intersection of the influencer and the at least one of the members indicated as applicable to the influencer by the weighted identifier generated for the influencer; and
combine the machine written code generated for each influencer for the target output based on the computation logic for the target output.

10. The system of claim 1, wherein each second dimension comprises members within the multidimensional database that are organized into mutually exclusive generations of the second dimension each corresponding to a different distance from a root node of the second dimension, and the computer-executable instructions upon execution cause the at least one processor to generate a graphical user interface (GUI) configured to display the application definition for the custom application.

11. A method for generating custom applications for querying a multidimensional database of a target platform, the method comprising:
receiving, by at least one processor, a request to build a custom application for querying a multidimensional database of a target platform, the multidimensional database stored at a memory device;
discovering, by the at least one processor, an application definition for the custom application by:
making an API call to a master data source associated with the multidimensional database to retrieve master data that indicates a hierarchical structure of the multidimensional database; and
determining the application definition based on the retrieved master data, the application definition indicating target outputs to be produced by the custom application based on data stored in the multidimensional database, influencers for each of the target outputs that correspond to members of one or more first dimensions of the multidimensional database, and granularity definitions relative to second dimensions of the multidimensional database for each of the influencers;
automatically grouping, by the at least one processor, the target outputs into a plurality of mutually exclusive groups each including two or more of the target outputs by applying a weighting algorithm to the application definition that:
assigns first weights to each influencer relative to the second dimensions based on the granularity definitions for the influencer;
assigns second weights to each target output relative to the second dimensions that correspond to the first weights assigned to the influencers for the target output; and
identifies the target outputs for each respective mutually exclusive group based on the second weights assigned to each target output;
for each respective mutually group of the plurality of mutually exclusive groups, dynamically generating, by the at least one processor, machine written code comprising a distinct code block for the respective mutually exclusive group by:
generating a first portion of the distinct code block based on the second weights assigned to the target outputs of the respective mutually exclusive group, the first portion of the distinct code block configured to retrieve a corresponding section of the multidimensional database for the respective mutually exclusive group and limit data retrieval to only the corresponding section of the multidimensional database based on the second weights assigned to the target outputs of the group; and generating a second portion of the distinct code block based on the first weights assigned to the influencers for the target outputs of the respective mutually exclusive group, the second portion of the distinct code block configured to generate the target outputs of the respective mutually exclusive group based on the corresponding section of the multidimensional database;

compiling, by the at least one processor, the machine written code into an application package corresponding to the target platform, the application package configured to query data from the multidimensional database and generate the target outputs by executing the distinct code blocks for each respective mutually exclusive group of the plurality of mutually exclusive groups; and deploying, by the at least one processor, the application package to the target platform for execution on the multidimensional database.

12. The method of claim 11, further comprising:
generating a weighted identifier for each target output based on the second weights assigned to the target output; and
grouping the target outputs having a same weighted identifier.

13. The method of claim 12, wherein the weighted identifier generated for each target output indicates which of the second dimensions are applicable to the target output with at least one of the second dimensions being indicated as applicable to the target output, and further comprising dynamically generating the first portion of the distinct code block for each respective mutually exclusive group such that the corresponding section of the multidimensional database retrieved by the first portion is limited to data within the multidimensional database corresponding to the at least one of the second dimensions indicated as applicable by the weighted identifier generated for each target output of the respective mutually exclusive group.

14. The method of claim 12, wherein each second dimension comprises members within the multidimensional database, the weighted identifier generated for each target output indicates which of the members of the second dimensions are applicable to the target output with at least one of the members of the second dimensions being indicated as applicable to the target output, and further comprising dynamically generating the first portion of the distinct code block for each respective mutually exclusive group such that the corresponding section of the multidimensional database retrieved by the first portion is limited to data within the multidimensional database corresponding to the at least one of the members indicated as applicable by the weighted identifier generated for each target output of the respective mutually exclusive group.

15. The method of claim 12, wherein the members of each second dimension are organized into mutually exclusive generations of the second dimension each corresponding to a different distance from a root node of the second dimension, the weighted identifier generated for each target output indicates which of the generations of the second dimensions are applicable to the target output with at least one of the generations of the second dimensions being indicated as applicable to the target output, and further comprising dynamically generating the first portion of the distinct code block for each respective mutually exclusive group such that the corresponding section of the multidimensional database retrieved by the first portion is limited to data within the multidimensional database corresponding to the at least one of the generations indicated as applicable by the weighted identifier generated for each target output of the respective mutually exclusive group.

16. The method of claim 11, wherein each second weight assigned to each target output corresponds to a different one of the second dimensions, and further comprising setting each second weight assigned to each target output to the greatest first weight assigned to the influencers for the target output relative to the second dimension to which the second weight corresponds.

17. The method of claim 11, wherein the application definition indicates computation logic for each target output that defines a relationship between the influencers for the target output and the target output, and further comprising dynamically generating as the second portion of the distinct code block for each respective mutually exclusive group machine written code for deriving each target output of the respective mutually exclusive group based on the computation logic for the target output and the first weights assigned to each influencer for the target output relative to the second dimensions.

18. The method of claim 17, further comprising:
generating via the weighting algorithm a weighted identifier for each influencer for each target output based on the first weights assigned to the influencer; and
dynamically generating as the second portion of the distinct code block for each respective mutually exclusive group machine written code for deriving each target output of the respective mutually exclusive group based on the computation logic for the target output and the weighted identifier generated for each influencer for the target output.

19. The method of claim 18, wherein each second dimension comprises members within the multidimensional database, the weighted identifier generated for each influencer for each target output indicates which of the members of the second dimensions are applicable to the influencer with at least one of the members of the second dimensions being indicated as applicable to the influencer, and dynamically generating the machine written code for deriving each target output based on the computation logic for the target output and the weighted identifier generated for each influencer for the target output comprises:
generating machine written code for each influencer for the target output that provides an intersection of the influencer and the at least one of the members indicated as applicable to the influencer by the weighted identifier generated for the influencer; and
combining the machine written code generated for each influencer for the target output based on the computation logic for the target output.

20. The method of claim 11, wherein each second dimension comprises members within the multidimensional database that are organized into mutually exclusive generations of the second dimension each corresponding to a different distance from a root node of the second dimension, and discovering the application definition comprises generating a graphical user interface (GUI) configured to display the application definition for the custom application.

21. A non-transitory computer readable medium storing a computer program for generating custom applications for querying a multidimensional database of a target platform, the platform comprising computer-executable instructions stored on the non-transitory computer readable medium that upon execution by one or more processors cause the one or more processors to:
- receive a request to build a custom application for querying a multidimensional database of a target platform, the multidimensional database stored at a memory device;
- discover an application definition for the custom application by:
  - making an API call to a master data source associated with the multidimensional database to retrieve master data that indicates a hierarchical structure of the multidimensional database; and
  - determining the application definition based on the retrieved master data, the application definition indicating target outputs to be produced by the custom application based on data stored in the multidimensional database, influencers for each of the target outputs that correspond to members of one or more first dimensions of the multidimensional database, and granularity definitions relative to second dimensions of the multidimensional database for each of the influencers;
- automatically group the target outputs into a plurality of mutually exclusive groups each including two or more of the target outputs by applying a weighting algorithm to the application definition that:
  - assigns first weights to each influencer relative to the second dimensions based on the granularity definitions for the influencer;
  - assigns second weights to each target output relative to the second dimensions that correspond to the first weights assigned to the influencers for the target output; and
  - identifies the target outputs for each respective mutually exclusive group based on the second weights assigned to each target output;
- for each respective mutually exclusive group of the plurality of mutually exclusive groups, dynamically generate machine written code comprising a distinct code block for the respective mutually exclusive group by:
  - generating a first portion of the distinct code block generated based on the second weights assigned to the target outputs of the respective mutually exclusive group, the first portion of the distinct code block configured to retrieve a corresponding section of the multidimensional database for the respective mutually exclusive group and limit data retrieval to only the corresponding section of the multidimensional database based on the second weights assigned to the target outputs of the group; and
  - generating a second portion of the distinct code block based on the first weights assigned to the influencers for the target outputs of the respective mutually exclusive group, the second portion of the distinct code block configured to generate the target outputs of the respective mutually exclusive group based on the corresponding section of the multidimensional database;
- compile the machine written code into an application package corresponding to the target platform, the application package configured to query data from the multidimensional database and generate the target outputs by executing the distinct code blocks for each respective mutually exclusive group of the plurality of mutually exclusive groups; and
- deploy the application package to the target platform for execution on the multidimensional database.

* * * * *